US009689092B2

(12) United States Patent
Liao et al.

(10) Patent No.: US 9,689,092 B2
(45) Date of Patent: *Jun. 27, 2017

(54) STRETCH CIRCULAR KNIT FABRICS WITH MULTIPLE ELASTIC YARNS

(71) Applicant: INVISTA NORTH AMERICA S.A. R.L., Wilmington, DE (US)

(72) Inventors: Tianyi Liao, Chadds Ford, PA (US); Fred C. Wynegar, Wilmington, DE (US); Raymond S. P. Leung, Shatin (HK); Cheng-Yuan Chuang, Panchiao (TW); Juan Cera, Middletown, DE (US)

(73) Assignee: INVISTA NORTH AMERICA S.A R.L., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/162,021

(22) Filed: May 23, 2016

(65) Prior Publication Data

US 2016/0265146 A1 Sep. 15, 2016

Related U.S. Application Data

(63) Continuation-in-part of application No. 15/097,446, filed as application No. PCT/US2014/060473 on Oct. 14, 2014.
(Continued)

(51) Int. Cl.
D04B 1/18 (2006.01)
D04B 13/00 (2006.01)

(52) U.S. Cl.
CPC ............... *D04B 1/18* (2013.01); *D04B 13/00* (2013.01)

(58) Field of Classification Search
CPC .......... D04B 1/18; D04B 1/102; D04B 1/123; D04B 9/16
See application file for complete search history.

(56) References Cited

U.S. PATENT DOCUMENTS 1,831,964 A * 11/1931 Lombardi ................ D04B 1/14
  66/190
2,054,059 A *  9/1936 Longtin .................... D04B 9/54
  66/172 E (Continued)

FOREIGN PATENT DOCUMENTS

WO  2006/107724 A1  10/2006
WO  2015/057697 A1   4/2015

OTHER PUBLICATIONS

International Search Report and Writen Opinion Received for PCT Applcation No. PCT/US2014/060473 mailed on Jan. 16, 2015, 10 pages.
(Continued)

*Primary Examiner* — Danny Worrell
(74) *Attorney, Agent, or Firm* — Bridget C. Sciamanna

(57) ABSTRACT

Articles of knit fabric having a surface side and a base side, and including a set of ground yarns and a layer of effect yarns, wherein the ground yarns and effect yarns are knit through intermesh points in a predetermined arrangement, wherein the effect yarns are alternately arranged with the ground yarns, and wherein the ground yarns contain at least one elastic fiber and optionally at least one hard fiber, and the effect yarns contain at least one hard fiber or at least one elastic fiber are provided.

34 Claims, 9 Drawing Sheets

Related U.S. Application Data

(60) Provisional application No. 61/890,663, filed on Oct. 14, 2013.

(56) References Cited

U.S. PATENT DOCUMENTS

| | | | | |
|---|---|---|---|---|
| 2,105,301 A * | 1/1938 | Saftlas | ............... | D04B 1/14 66/190 |
| 2,176,533 A * | 10/1939 | Logan | ............... | D04B 1/10 66/190 |
| 2,192,798 A * | 3/1940 | Page | ............... | D04B 1/18 66/173 |
| 2,236,758 A * | 4/1941 | Lumsden | ............... | D04B 1/18 66/190 |
| 2,378,780 A * | 6/1945 | Lombardi | ............... | D04B 1/18 66/176 |
| 3,115,693 A * | 12/1963 | Chandler | ............... | D04B 1/16 156/148 |
| 3,461,695 A * | 8/1969 | Knohl | ............... | D04B 1/24 66/178 A |
| 3,487,662 A * | 1/1970 | Safrit | ............... | A41B 11/12 2/240 |
| 3,884,053 A * | 5/1975 | Niederer | ............... | D04B 9/10 66/190 |
| 3,949,570 A * | 4/1976 | Niederer | ............... | D04B 9/10 66/10 |
| 3,986,374 A * | 10/1976 | Fane | ............... | D04B 1/102 442/313 |
| 4,522,044 A * | 6/1985 | Lineberry | ............... | A41B 11/02 66/172 E |
| 4,794,767 A | 1/1989 | Lombardi | | |
| 5,623,839 A | 4/1997 | Hoggarth et al. | | |
| 6,089,052 A * | 7/2000 | Riegger | ............... | D04B 1/16 66/195 |
| 2007/0259583 A1 | 11/2007 | Laycock et al. | | |
| 2012/0122364 A1 | 5/2012 | Menczywor | | |
| 2016/0251782 A1 | 9/2016 | Liao et al. | | |

OTHER PUBLICATIONS

International Preliminary Report on Patentability Report Received for PCT Patent Application No. PCT/US2014/060473, mailed on Apr. 28, 2016, 7 pages.

* cited by examiner

STRETCH CIRCULAR KNIT FABRICS WITH MULTIPLE ELASTIC YARNS

BACKGROUND OF THE INVENTION

Field of the Invention

This invention relates to a method for making elastic knit fabric that looks and performs like a woven fabric, with soft hand, good drape, high holding force and recovery power in all directions. More specifically, this invention relates to the stretch knit fabrics comprising a jersey loop base intermeshed with a set of extra surface effect yarns. This invention also relates to such knit fabrics and the garments made from such fabrics.

Summary of Related Art

Circular knit fabrics are used to make underwear and top-weight garments, such as T-shirts. Compared to woven structures, the knit fabric can more easily deform, or stretch, by compressing or elongating the individual knit stitches (comprised of interconnected loops) that form the knit fabric. This ability to stretch in all directions by stitch rearrangement adds to the wearing comfort of garments made from knit fabrics. Even when knit fabrics are constructed of 100% hard yarns, such as cotton, polyester, nylon, acrylics or wool, for example, there is some recovery of the knit stitches to original dimensions after imposed forces are removed. However, this recovery by knit stitch rearrangement generally is not complete because hard yarns, which are not elastic yarn, do not provide a recovery force to rearrange the knit stitches.

To improve the recovery performance of circular knit fabrics, it is now common to co-knit a small amount of spandex fiber with the companion hard yarn. The spandex makes the fabric with higher stretch level and better recovery power. Fabric and garment manufacturers generally know how to make fabrics with the right quality parameters to achieve fabrics acceptable to consumers. However, for stretch circular knit fabric, a typical quality issue is that the fabric can't quickly recovery to original size and shape after fabrics are over stretched out in some parts of the body, particularly in bottom of the body, such as in knee, butt and waist. Consumers see baggy and saggy issues after long time wear, which limits the penetration of circular knits in bottom weights, such as pants and denims.

As a general rule, woven fabrics have very different qualities from knitted fabrics. Woven fabrics such as denim, gabardine, poplin, and others tend to be stable, and have better shape retention, less flexible and less soft, and only have stretch in the direction that elastic yarns are added. The manufacture process of making woven is normally more complicated and costly. Before weaving, it is necessary to make core spun yarn or covered first by combining elastic yarn and hard yarn together.

SUMMARY OF THE INVENTION

As described above woven and knit fabrics have different properties, which each provide different benefits. Therefore, there is a need to produce hybrid stretch knit fabrics that have woven fabric look and performance, have good stretch in all directions, easy processing, low shrinkage, ease of garment making, and excellent recovery power and low growth. Ideally, these knit fabrics are useful for bottom weight garments such as pants and jeans. Such fabrics are also useful for active wear and intimate wear, such as, but not limited to, bras, underwear, shaping wear, camisoles, leggings and sport bras.

Some aspects aim to provide a hybrid elastic knitted fabric that has the look, the feel and the performance of a woven fabric. Also included is a method to make such fabrics through knitting.

According to an exemplary aspect, there is provided an article including a fabric having a face side and a base side and including a set of ground yarns and a layer of effect yarns, knitted together in a pattern, wherein the ground yarns include at least one elastic yarn and optionally at least one hard yarn. In one nonlimiting embodiment, the effect yarns also contain at least one elastic yarn or at least one elastic yarn. The elastic yarns generate the stretch and recovery of fabric in both the vertical and horizontal directions. The elastic yarns cause the fabric to shrink and the yarns within to pull together during fabric and garment finishing process. The fabric transfers into 3D structure with base and surface two side effects, wherein the ground yarns form the knit structure as fabric base and the effects yarns form the woven structure as fabric surface.

In accordance with some aspects, the elastic yarn is an elastomeric fiber such as spandex. The content of elastomeric yarn is higher than 1%. This includes from 1% to about 85%, 1% to about 65%, about 2% to about 55%, about 2% to about 50%, and about 2% to about 22% of total fabric weight. The elastic yarn may be incorporated into fabric at a minimum of 1.5× draft.

According to some aspects, the elastic yarn is non-elastomeric elastic fiber. The content of non-elastomeric elastic yarn is higher than 5% and lower than 85% of total fabric weight.

According to some aspects, the elastic yarn is polyester bi-component filament comprising poly(trimethylene terephthalate) and at least one polymer selected from the group consisting of polyethylene terephthalate), poly(trimethylene terephthalate), and poly(tetramethylene terephthalate) or a combination of such members, wherein the yarn denier is from about 20 to about 600 and the bi-component filament is from about 5 weight percent to about 65 weight percent, based on total weight of the fabrics, and wherein the fabric is substantially free of grin-through of bi-component filament.

Some aspects further provide a hybrid stretch circular knit fabric includes an elastic jersey knit base and a layer of effect yarns forming the fabric surface with woven fabric appearance and characteristics, wherein the jersey knit base contained at least two kinds of the elastic fibers including elastomeric fiber and non-elastomeric fiber, such as spandex and polyester bi-components fibers, and wherein the fabric is substantially free of bi-component filament grin-through.

Some aspects provide a hybrid stretch circular knit fabric comprising elastomeric fibers in both base yarn, also referred to herein as ground yarn and used interchangeably, and effect yarn. The elastomeric fibers in the base yarn and effect yarn may be the same or different in denier, draft, or polymer composition.

Additionally provided is a method to make a hybrid stretch knitted fabric with woven like performance, including a set of ground yarns and a layer of effect yarns, knitting together in a pattern, wherein the ground yarns comprise at least one elastic yarn and optionally with at least one hard yarn. In one nonlimiting embodiment, the effect yarns form the woven like surface with at least 1 float count, at least a 1:1 ratio of float count:loop count, and preferably 1 shift count. The effect yarn can be selected from a group of: indigo dyed cotton yarn, un-dyed cotton yarn, textured nylon, textured polyester and others.

Also provided is a hybrid fabric and garment made by one of these alternate methods. Some forms of circular knit stitch pattern may be used for jersey loop base. Further processing may include scouring, bleaching, dyeing, drying, sanforizing, singeing, de-sizing, mercerizing, and any combination of such steps. A garment comprising the stretch fabric of the some aspects can be processed in garment washing, stone wash, sand blasting, garment dye and other wet and dry garment processes.

BRIEF DESCRIPTION OF THE FIGURES

The detailed description will refer to the following drawings, wherein like numerals refer to like elements and wherein.

DETAILED DESCRIPTION OF THE INVENTION

Figure 1:
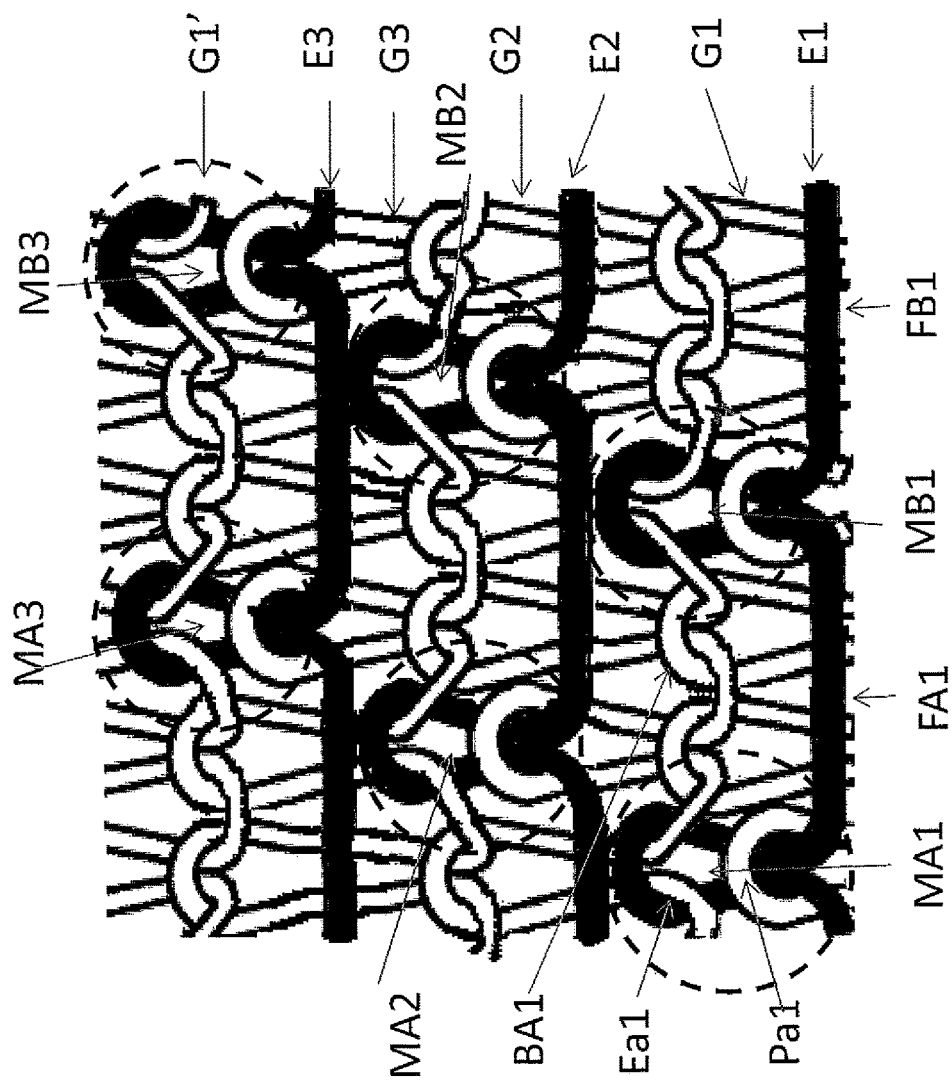
FIG. 1 is a schematic diagram of hybrid knit stitches comprising a set of effect yarns and a set of elastic ground yarn with 1/2 right hand twill.

"Elastic fiber" or "elastic yarn" refers to the fiber or the yarn with elastic and recovery properties. Elastic fiber or elastic yarn includes elastomeric fibers, such as, but not limited to, spandex, biconstituent filament, lastol filament, elastoester, and non-elastomeric elastic fibers such as, but not limited to, polyester bi-component stretch fiber, textured PPT stretch filament, textured PET stretch filament, or PBT stretch filament. "Elastic yarn" and "elastic fiber" are used interchangeably in this context herein.

Elastomeric fibers are commonly used to provide stretch and elastic recovery in fabrics and garments. "Elastomeric fibers" are either a continuous filament (optionally a coalesced multifilament) or a plurality of filaments, free of diluents, which have a break elongation in excess of 100% independent of any crimp. An elastomeric fiber when (1) stretched to twice its length; (2) held for one minute; and (3) released, retracts to less than 1.5 times its original length within one minute of being released. As used in the text of this specification, "elastomeric fibers" means at least one elastomeric fiber or filament. Such elastomeric fibers include but are not limited to rubber filament, biconstituent filament and elastoester, lastol, and spandex.

"Spandex" is a manufactured filament in which the filament-forming substance is a long chain synthetic polymer comprised of at least 85% by weight of segmented polyurethane.

"Elastoester" is a manufactured filament in which the fiber forming substance is a long chain synthetic polymer composed of at least 50% by weight of aliphatic polyether and at least 35% by weight of polyester.

"Biconstituent filament" is a continuous filament comprising at least two polymers adhered to each other along the length of the filament, each polymer being in a different generic class, for example, an elastomeric polyetheramide core and a polyamide sheath with lobes or wings.

"Lastol" is a fiber of cross-linked synthetic polymer, with low but significant crystallinity, composed of at least 95 percent by weight of ethylene and at least one other olefin unit. This fiber is elastic and substantially heat resistant.

"Polyester bi-component filament" means a continuous filament comprising a pair of polyesters intimately adhered to each other along the length of the fiber, so that the fiber cross section is, for example, a side-by-side, eccentric sheath-core or other suitable cross-section from which useful crimp can be developed. The polyester bicomponent filament comprises poly(trimethylene terephthalate) and at least one polymer selected from the group consisting of poly(ethylene terephthalate), poly(trimethylene terephthalate), and poly(tetramethylene terephthalate) or a combination of such members, having an after heat-set crimp contraction value of from about 10% to about 80%.

"Non-elastomeric elastic fibers" means a stretch filament without containing elastomeric fiber. However, the recoverable stretch of such yarn must be higher than 15% as tested by ASTM D6720-07 methods, such as textured PPT stretch filament, textured PET stretch filament, bi-component stretch filament fiber, or PBT stretch filament. These yarns develop additional crimp upon exposure to a hot, wet condition.

A "pre-covered elastic yarn" is one surrounded by, twisted with, or intermingled with hard yarn before the core spun process. The pre-covered elastic yarn that comprises elastomeric fibers and hard yarns is also termed a "pre-covered yarn" in the text of this specification. The hard-yarn covering serves to protect the elastomeric fibers from abrasion during textile processes. Such abrasion can result in breaks in the elastomeric fiber with consequential process interruptions and undesired fabric non-uniformities. Further, the covering helps to stabilize the elastomeric fiber elastic behavior, so that the elongation of pre-covered elastic yarn can be more uniformly controlled during textile processes than would be possible with bare elastomeric fibers. The pre-covered yarn also can increase the tensile modulus of the yarn and fabric, which is helpful to improve the fabric recovery power and dimensional stabilities.

The pre-covered yarns include: (a) single wrapping of the elastomer fibers with a hard yarn; (b) double wrapping of the elastomer fibers with a hard yarn; (c) continuously covering (i.e., corespun or core-spinning) an elastomer fiber with staple fibers, followed by twisting during winding; (d) intermingling and entangling elastomer and hard yarns with an air jet; and (e) twisting an elastomer fibers and hard yarns together.

"Grin-through" is a term used to describe the exposure, in a fabric, of elastic yarn to view. Grin-through can manifest itself as an undesirable glitter. If a choice must be made, low grin through on the face side is more desirable than low grin-through on the back side.

"Draft" refers to the amount of stretch applied to the spandex. The draft of a fiber is directly related to the elongation (stretching) applied to the fiber (e.g. 100% elongation corresponds to 2× draft, 200% elongation corresponds to 3× draft, etc).

"Hard yarn" means a knitting yarn, which does not contain a high amount of elastic stretch, such as a spun cotton yarn, textured polyester filament or a nylon synthetic fiber.

The term "circular knitting" means a form of weft knitting in which the knitting needles are organized into a circular knitting bed. Generally, a cylinder rotates and interacts with a cam to move the needles reciprocally for knitting action. The yarns to be knitted are fed from packages to a carrier plate that directs the yarn strands to the needles. The circular knit fabric emerges from the knitting needles in a tubular form through the center of the cylinder. Seamless knit machine and flat knit machine are also included in this form of knitting.

"Flat knitting" is a method for producing knitted fabrics, in which the work is turned periodically, i.e., the fabric is worked with alternating sides facing the knitter. A "Flat" or Vee Bed knitting machine consists of 2 flat needle beds arranged in an upside-down "V" formation. These needle beds can be up to 2.5 meters wide. A carriage, also known as a cambox or head, moves backwards and forwards across these needle beds, working the needles to selectively, knit, tuck or transfer stitches. A flat knitting machine is very flexible, allowing complex stitch designs, shaped knitting and precise width adjustment. It is, however relatively slow when compared to a circular machine.

The term "intermeshing point" means where the effect yarn is knitted into a base knitted fabric to form the binding connection between effect yarn and base fabrics via the knit stitch. The "float count" means the number of interval wales that the effect yarn float over between two intermeshing points along the same course. The yarn segment in the float area is straight and flat as the yarn is woven, where it is not easy to be stretched out and provide the function to block the extension of the fabric in course direction. "Loop count" means the number of wales that form the intermeshing point. The yarn segment in this portion is in loop form as normal knit fabric structure and easier to be stretched out with low stability.

"Fabric surface" means the use face of the fabric in garment applications. Actually, it could be the technical back side or technical face side of the fabric, which is the inside or outside of fabric in the tube form on circular knit machine. "Previous ground course" means the ground yarn course that has just been knitted before the needle begins to rise to knit the surface yarn. "Future Ground course" is the ground course will be knitted following the surface yarn.

"Shift count" means the displaced wales number that the intermesh point in next course of effect yarn shifts or is displaced from the intermesh point in current effect yarn course. For example, in a ½ twill structure, the intermesh points make a pattern of diagonal lines. Each effect yarn lift over or float over two wales of the ground yarn in base fabric. Adjacent course of effect yarns make the same floating pattern, but displaced by one wale. The shift count of this ½ twill fabric is 1. If the intermesh point shifts from left to right, it is called right shift count. If the intermesh point shifts from right to left, it is called left shift count.

An elastic knit fabric that looks and performs like a woven fabric will necessarily include a set of ground yarns, also referred to herein as base yarn or base yarns and used interchangeably, forming a loop structure as the fabric base, and a layer of effect yarns forming the fabric surface. The ground yarns include at least one elastic fiber and optionally the hard yarns. The elastic yarns form the loop structures with adequate power to hold the knit stitches and form the double layers fabric structures with woven-like surface. The elastic yarns not only generate the stretch and recovery force of the fabric in both vertical and horizontal directions, but also provide the power for the fabric to shrink and jam up into 3D structure with base and surface two side effects.

The effect yarns, comprising at least one hard yard and/or at least one elastic yarn, float over the jersey loop base with long float, and bind with the ground yarns through intermesh points in regular intervals. The pattern of intermeshing points on the fabric surface with consistent shift count creates the diagonal lines of woven twill and twill derivatives. The straight and flat float lengths of effect yarn and the regular diagonal twill lines on the fabric surface make the face side of the knitted fabric look like a woven. The fabric is substantially free of grin-through of jersey loop base from the fabric surface. The base fabric is substantially invisible from the fabric surface.

In one nonlimiting embodiment, the size of effect yarn is between 100 S to 6S English count number and the effect yarns are single end, or multiple twist threads or multiple separated ends.

FIG. 1 shows the detailed structure of an example fabric with ½ right hand twill appearance in one repeated pattern. Within one repeated pattern, three effect yarns E1, E2 and E3 are intermeshed with ground yarns G1, G2 and G3 through the intermeshing points MA1,MB1, MA2,MB2, and MA3, MB3. The ground yarns G1, G2 and G3 are knitted together to form the single jersey stitch loops in every needle wales of successive courses of the fabric, which form the base fabric BA1. Each of ground yarns G1, G2 and G3, comprise at least one elastic yarn and optionally a hard yarn. The elastic and hard yarns are knitted together by plating in parallel, side-by-side relation.

The effect yarn E1 floats over 2 wales between intermesh point MA1,MB1 and form the float length FA1 and FB1. Within this repeated pattern, the effect yarns E1, E2 and E3 float over the jersey loop base BA1 with 2 float count and knitted together with ground yarns G1, G2 and G3 in regular intervals. FIG. 1 also shows the detailed structure of loop stitch in intermeshing points. For example, in intermeshing point Pa1, the surface yarn E1 is held and bound with previous course G1 and future course G2, where the sinker loop of the effect yarn E1 is meshed with the needle loop of the previous ground course G1 to form the contact point Pa1. The needle loop of the ground yarn E1 is meshed with sinker loop of the future ground course G2 to form the contact point Ea1. Such structures step up the float portion FA1 and FB1 of the surface yarn and form woven-like flat appearance on the fabric surface.

The intermesh and float pattern of effect yarn E2 is the same as effect yarn E1, but the intermesh point MA2 is displaced by 1 wale toward right direction. As compared with the intermesh point MA1 created by effect yarn E1 in current surface course, the intermeshing point MA2 created by effect yarn E2 in next surface course shifts up one wale toward right hand direction. In one repeated pattern, a group of intermesh points MA1, MA2 and MA3 create diagonal line of woven twill toward right hand direction. It is called right hand twill line. Another group of intermesh points MB1, MB2 and MB3 create second diagonal twill line. The combination of these lines forms the twill or twill derivative patterns of the woven on the fabric surface. If the intermesh points shift up in opposite direction (toward left hand direction) in adjacent course, the fabric surface has left hand twill effect.

Figure 2:
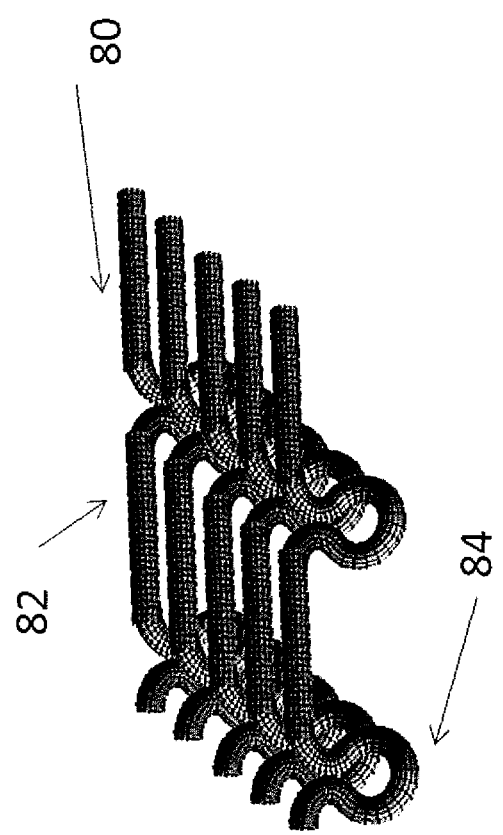
FIG. 2 is a 3D graphic demonstration of woven alike fabric surface straight yarn segments forming the flat surface and intermesh points forming a diagonal twill line.

FIG. 2 shows the graphic figure of a woven alike surface (80) of this new innovation fabric, constituted with a flat surface formed by straight segments (82) of effect yarns and the diagonal twill line formed by intermesh points (84) with a regular shift.

The disclosed method of knitting the circular knit fabric with woven like surface is carried out on a circular knitting machine, including two groups of yarn feeding stations: ground yarn feeders and effect yarn feeders. These two groups of yarn feeders are provided around the circularly arranged cylinder needles. They provide the ground yarn for base fabric and the effect yarn for fabric surface to the cylinder needles, respectively.

Figure 3:
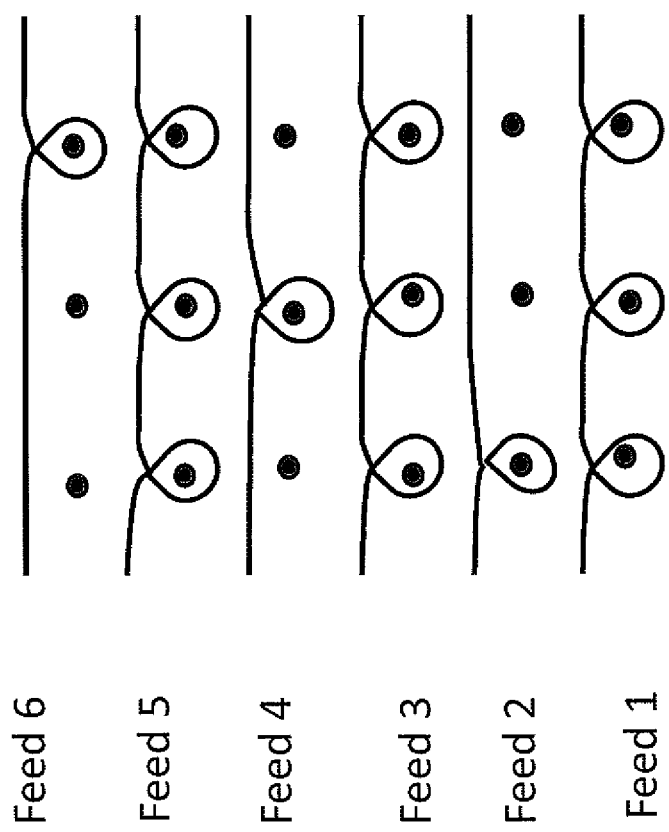
FIG. 3 is a diagrammatic form of stitch notation for a repeat of circular knitting with 1/2 right hand twill structure. The stitch loops in intermeshing points are knit loops.

In order to make present fabric, the ground yarns and effect yarns are required to be fed in and be knitted in an alternating pattern. FIG. 3 shows the schematic diagram of stitch notation for making a knit fabric with 1½ right hand twill surface, as demonstrated in FIG. 1. The yarns are fed at alternating feeders around the machine. The ground yarns G1, G2 and G3 are located in Feed 1, Feed 3 and Feed 5. The effect yarns E1, E2 and E3 are located in Feed 2, Feed 4 and Feed 6. In Feed 1, Feed 2 and Feed 3, all needles actively knit and the ground yarn is knitted together to form the jersey loop base in single jersey loop pattern. In Feed 2, Feed 4 and Feed 6, the effect yarns are introduced, and there is only one needle to interactively knit. Other two needles do not participate in knitting, but keep floating. The interactive knitting produces the stitch of intermesh point. The non-knitting positions make the stitch of floating portion. The intermesh point of the effect yarn in feed 4 is shifted one wale toward right from the intermesh point in feed 2. Also, the intermesh point of the effect yarn in feed 6 is shifted one wale toward right from the intermesh point in feed 4.

Figure 4:
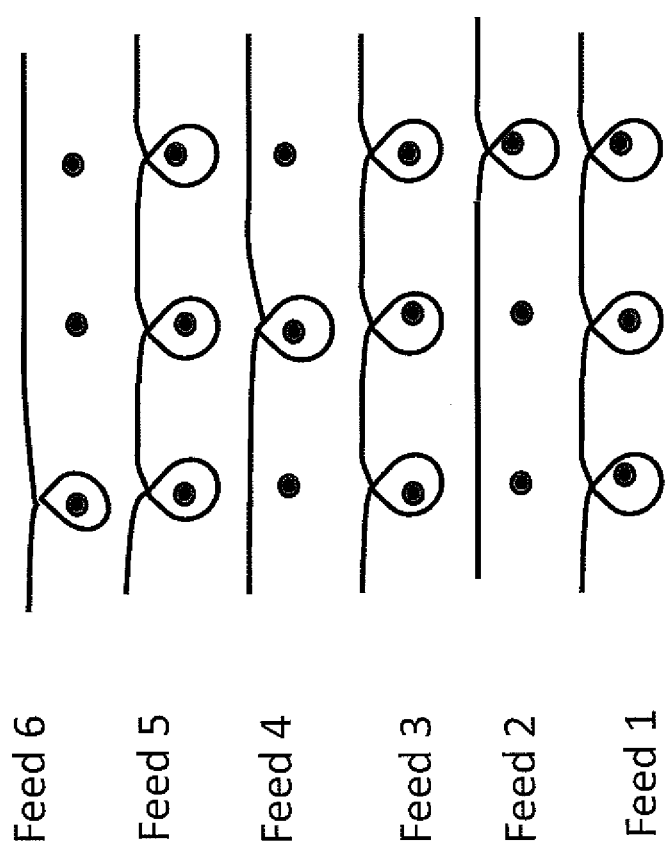
FIG. 4 is a diagrammatic form of stitch notation for a repeat of circular knitting with 1/2 left hand twill structure.
Figure 5:
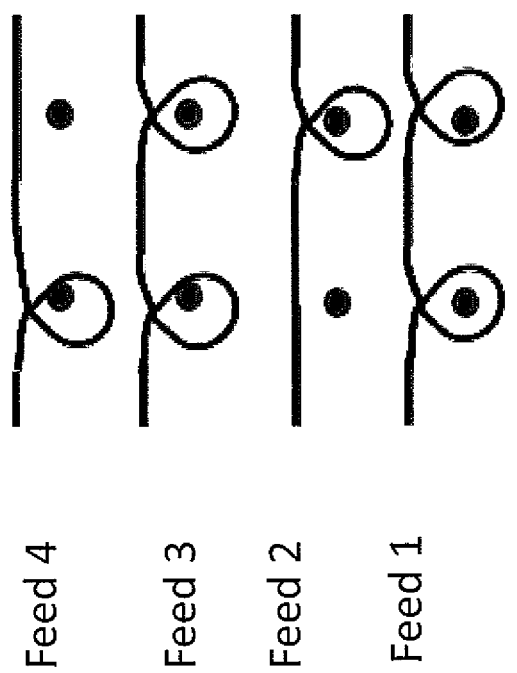
FIG. 5 is a diagrammatic form of stitch notation for a repeat of a circular knitting with 1/1 plain structure.

The different twill appearance on fabric surface can be achieved by changing the active knitting position, float count, the intermesh points number and shift count and direction. FIG. 4 shows the knit patterns for ½ left twill with float count 2 and loop count 1 in effect yarn. FIG. 5 shows the knit pattern for 1/1 plain structure with float count 1 and loop count 1 in effect yarn.

The base yarn feeders provide at least one elastic yarn to the knitting needles, preferably, with at least one hard yarn. Without hard yarn, two kinds of elastic yarns with different properties are also able to be fed into the machine to create the jersey loop bases. In addition, even one elastic fiber is able to be used as ground yarn to make the present innovative fabrics. Another option is to deliver two elastic yarns with the hard yarns together to the needle bed under constant tension. As a nonlimiting example, the two elastic yarns are spandex and polyester bi-component yarn together with cotton spun yarn, respectively.

Figure 6:
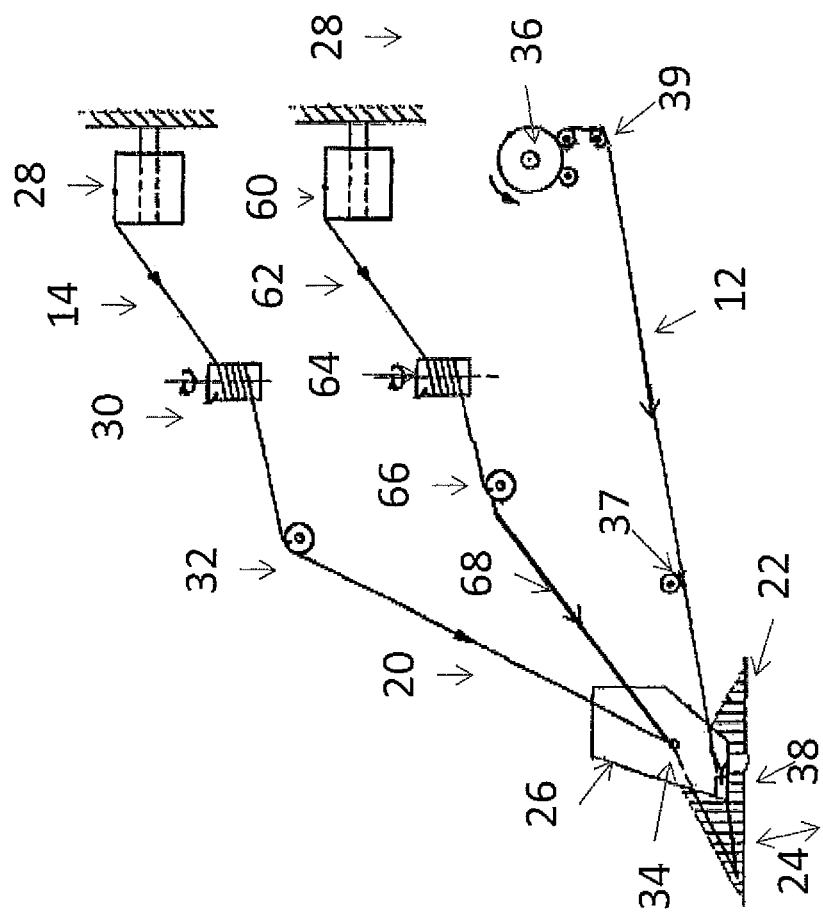
FIG. 6 is a schematic diagram of a portion of a circular knitting machine fed with a hard yarn feed, a non-elastomeric elastic yarn feed, and a spandex yarn feed to form base fabric.

FIG. 6 shows in schematic form one base yarn feeder position 20 of a circular knitting machine having a series of knitting needles 22 that move reciprocally as indicated by the arrow 24 in response to a cam (not shown) below a rotating cylinder (not shown) that holds the needles. In a circular knitting machine, there are multiple numbers of these feed positions arranged in a circle, so as to feed individual knitting positions as the knitting needles, carried by the moving cylinder, are rotated past the positions.

The device shown in FIG. 6 could be used as ground yarn feeders for producing knit fabrics with woven fabric performance, where two elastic yarns and one hard yarn have the same stitch patterns. Three yarns are knitted together in the same routes as base knitting fabric. Single jersey structure can be made.

During plating knit operations, an elastomeric yarn 12, a non-elastomeric yarn 62, and a hard yarn 14 are delivered to the knitting needles 22 by a carrier plate 26. The carrier plate 26 simultaneously directs all three yarns to the knitting position. The elastomeric yarn 12, non-elastomeric elastic yarn 62 and hard yarn 14 are introduced to the knitting needles 22 to form a base knitting fabric BA1, as shown in FIG. 1.

The hard yarn 14 is delivered from a wound yarn package 28 to an accumulator 30 that meters the yarn to the carrier plate 26 and knitting needles 22. The hard yarn 14 passes over a feed roll 32 and through a guide hole 34 in the carrier plate 26. Optionally, more than one hard yarn may be delivered to the knitting needles via different guide holes in the carrier plate 26.

The non-elastomeric elastic yarn 62 is delivered from a wound yarn package 60 to an accumulator 64 that meters the yarn to the carrier plate 26 and knitting needles 22. The non-elastomeric yarn 62 passes over a feed roll 66 and through a guide hole 34 in the carrier plate 26.

The elastomeric yarn 12 is delivered from a surface driven package 36 and past a broken end detector 39 and change of direction roll(s) 37 to a guide slot 38 within the carrier plate 26. The feed tension of the spandex 12 is measured between the detector 39 and drive roll 37, or alternatively between the surface driven package 36 and roll 37 if the broken end detector is not used. The guide hole 34 and guide slot 38 are separated from one another in the carrier plate 26 so as to present the hard yarn 14, non-elastomeric yarn 62, and elastomeric yarn 12 to the knitting needles 22 in side by side, generally parallel relation (plated). Commercially available elastane products for circular knitting are useful in some aspects. Examples of commercially available brands include Lycra® (a registered trademark of Invista S. a r.l.) types 162, 169 and 562 (available from Invista S. a r.l.).

The elastomeric yarn stretches (drafts) when it is delivered from the supply package to the carrier plate and in turn to the knit stitch due to the difference between the stitch use rate and the feed rate from the elastomeric yarn supply package. The ratio of the hard yarn supply rate (meters/min) to the elastomeric yarn supply rate is normally 2.0 to 4 times (2.0× to 4×) greater, and is known as the machine draft. This corresponds to elastomeric yarn elongation of 100% to 300%, or more. The feed tension in the elastomeric yarn is directly related to the draft of the elastomeric yarn. This feed tension is typically maintained at values consistent with high machine drafts for the elastomeric yarn. We found that improved results are obtained when the total elastomeric yarn draft, as measured in the fabric, is kept to about 5× or less, typically 3× or less, for example 2.5× or less. This draft value is the total draft of the elastomeric yarn, which includes any drafting or drawing of the elastomeric yarn that is included in the supply package of as-spun yarn. The value of residual draft from elastomeric yarn is termed package relaxation, "PR", and it typically ranges from 0.05 to 0.15 for the elastomeric yarn used in circular knit, elastic, single jersey fabrics. The total draft of the elastomeric yarn in the fabric is therefore MD*(1+PR), where "MD" is the knitting machine draft. The knitting machine draft is the ratio of hard yarn feed rate to elastomeric yarn feed rate, both from their respective supply packages. Because of its stress-strain properties, elastomeric yarn drafts more as the tension applied to the elastomeric yarn increases; conversely, the more that the elastomeric yarn is drafted, the higher the tension in the yarn. A typical elastomeric yarn path, in a circular knitting machine, is schematically shown in FIG. 6. The elastomeric yarn 12 is metered from the supply package 36, over or through a broken end detector 39, over one or more change-of-direction rolls 37, and then to the carrier plate 26, which guides the elastomeric yarn to the knitting needles 22 and into the stitch. There is a build-up of tension in the elastomeric yarn as it passes from the supply package and over each device or roller, due to frictional forces imparted by each device or roller that touches the elastomeric yarn. The total draft of the elastomeric yarn at the stitch is therefore related to the sum of the tensions throughout the elastomeric yarn path. The elastomeric yarn feed tension is measured between the broken end detector 39 and the roll 37 shown in FIG. 6. Alternatively, the elastomeric yarn feed tension is measured between the surface driven package 36 and roll 37 if the broken end detector 39 is not used. The higher this tension is set and controlled, the greater the elastomeric yarn draft will be in the fabric, and vice versa. For example, this feed tension can range from 2 to 4 cN for 22 dtex elastomeric yarn and from 4 to 6 cN for 44 dtex elastomeric yarn in commercial circular. With these feed tension settings and the additional tensions imposed by subsequent yarn-path friction, the elastomeric yarn in commercial knitting machines will be drafted significantly more than 3×. Minimizing the spandex friction between the supply package and the knit stitch helps to keep the elastomeric yarn feed tensions sufficiently high for reliable elastomeric yarn feeding when the elastomeric yarn draft is 7× or less. For reliably feeding elastomeric yarn from the supply package to the knit stitch, the elastomeric yarn draft is typically 3× or less.

The non-elastomeric yarn 62 is stretched (drafted) before it enters the knitting needle 22. The yarn is stretched out through the speed difference between an accumulator 64 and the carrier plate 26 and in turn to the knit stitch. The ratio of the feed rate from the stitch use rate to the accumulator 64 (meters/min) is normally 1.01× times to 1.35× times (1.01× to 1.35×). Adjusting the speed of accumulator 64 gives the desired draft or stretch ratio. Too low a stretch ratio will result in low quality fabrics having grin-through. Too high a stretch ratio will result in breakage of the non-elastomeric yarns.

The alternative forms of feeding method for making the present innovative fabric also can be realized by modifying this feeder device. If hard yarn 14 is not used and the hard yarn carriers keep empty, this base yarn feeder device can be used to feed elastomeric yarn and non-elastomeric elastic yarn. These two elastic yarns form the ground yarn of base knit fabric. Similarly, if the non-elastomeric elastic yarn 62 is not used, this device can introduce hard yarn 14 and elastomeric yarn 36 into machine and produce the base knit fabric with hard yarn, such as cotton yarn, and elastomeric yarn, such as spandex. This device also can be used to deliver non-elastomeric elastic fiber, without hard yarn and elastomeric yarn, to make base knit fabric only containing non-elastomeric elastic fiber, such polyester bi-component yarn.

Figure 7:
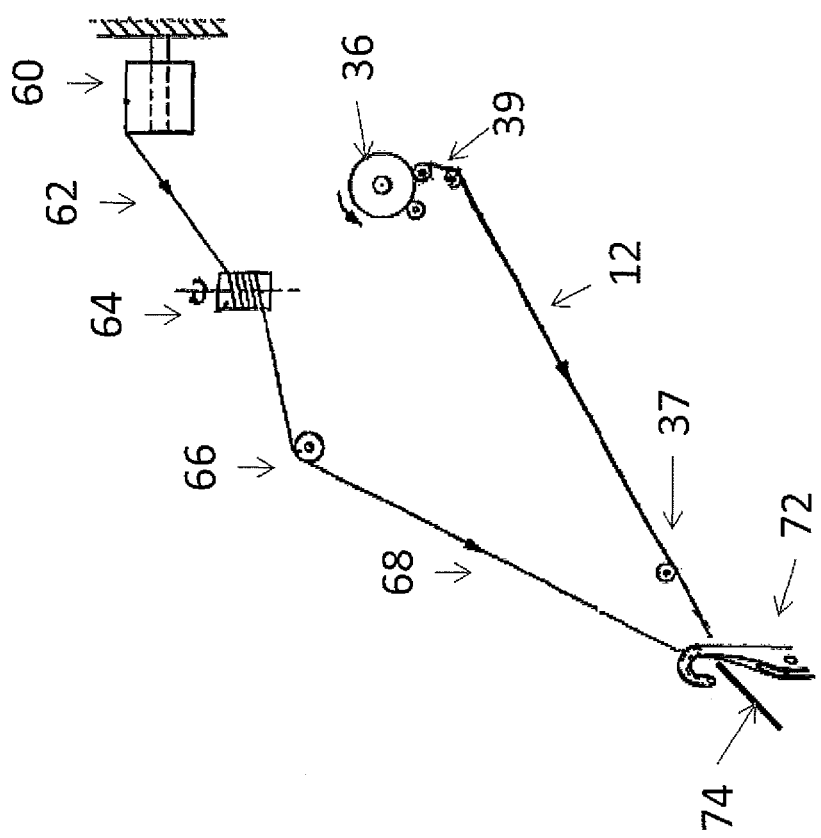
FIG. 7 is a schematic diagram of a portion of a circular knitting machine. A non-elastomeric elastic yarn and a spandex yarn are fed and combined together in a knit needle to form base fabric.

FIG. 7 demonstrates another form of yarn feeding system useful in some aspects. Both non-elastomeric and elastomeric yarns are merged together in knitting needles directly, without prior merging in carrier plate 26. This setting gives the further flexibilities for knit designers to develop different style and different pattern fabrics, such as in Santoni seamless machines.

According to some aspects, the elastic yarn inside the ground yarns of the fabric is elastomeric yarn, such as spandex. In some embodiments, fabric with unexpectedly high stretch and recovery properties were achieved in both vertical and horizon directions with comparatively low amounts of elastic fibers. The retractive force of elastomeric yarn retracts back and jams up the fabric to form a 3D structure with the double side effects.

The bare elastomeric yarn (prior to knitting to fabric) may be from about 11 dtex to about 444 dtex (denier—about 10D to about 400D), including 11 dtex to about 180 dtex (denier 10D to about 162D). During the knitting process, the elastomeric yarn is drafted between 2.0× to 6× its original length.

It is found that a hard yarn can be plated together with the elastomeric yarn to form the jersey loop base, with yarn count from 10 denier to 1000 denier. Several kinds of hard yarn can be used, such as cotton, wool, cellulosic fibers, polyester filament and nylon filament. Textured polyester and nylon filaments are preferable. These hard yarns provide opportunity to add extra function into fabrics. For example, polyester and nylon filament will increase the tenacity of cotton fabrics and improve the wrinkle resistant abilities. Cotton and wool yarn increase the moisture of synthetic fabrics. Special function yarns can also be introduced such as, but not limited to, yarn with moisture management ability, thermal protection ability, anti-bacteria ability and/or soft hand properties. For example, Coolmax® fiber that helps absorb moisture from the body and quickly deliver to the outside or conductible fiber that conducts electricity may be used. Fibers with anti-biotic and micro-capsules also can be used to provide the fabrics with body care, freshness and easy care properties. Fibers with enhanced thermal performance such as, but not limited to, THERMOLITE® fiber that increase the thermal resistance and thermal insulation, and THERMOLITE® IR fiber that generate heat under infrared light can also be used. Soft hand fiber such as, but not limited to, micro denier polyester and cotton-touch Supplex® nylon fiber can also be incorporate to improve the fabric hand touch and appearance.

Hard fibers used in base yarn and effect yarn can be selected from the same types of fibers or different types of fibers. When different types of yarns are selected, the fabric can have two side effects, such as different colors, different texture or different performance in the face and back side of the fabrics. As a nonlimiting example, a fabric with TENCEL® fiber in surface and nylon fiber in back, can produce two color effects in surface and back of fabric, through different dying methods.

In one nonlimiting embodiment, effect yarn comprises a cotton staple spun yarn, a cellulosic fiber spun yarn such as TENCEL®, a cellulosic fiber spun yarn such as Model®, or a blended spun yarn thereof.

In one nonlimiting embodiment, ground yarns are hidden inside the fabric by the adjacent effect yarns and are substantially not visible on the fabric surface. This is accomplished in part by including a effect yarn that has at least the same denier as the ground yarns, and desirably, an effect yarn that has a greater denier than the ground yarn.

Elastomeric fiber content within the fabric may be from about 1% to about 85% by weight based on the total fabric weight, including from about 1% to about 65%, about 2% to about 55%, about 2% to about 50% and about 2% to about 22% of total fabric weight. Also provided are fabrics and a method for making a stretch knit fabric with woven like surface, where various weave patterns on the jersey loop bases can be applied, including single knit, single plain jersey, rib, and dobby, fleece, terry and combinations thereof and others.

Unexpectedly, it is also was found that the heatset process may not be required for the present innovative circular knit fabric. The fabric meets many end use specifications without heat setting. The high denier ration between effect yarn and ground yarn, and the high ratio of float count vs. loop count of effect yarn make the fabric maintaining shrinkage of less than about 10% even without heatset. Heat setting "sets" spandex in an elongated form. This is also known as re-deniering, wherein a spandex of higher denier is drafted, or stretched, to a lower denier, and then heated to a sufficiently high temperature, for a sufficient time, to stabilize the spandex at the lower denier. Heat setting therefore means that the spandex permanently changes at a molecular level so that recovery tension in the stretched spandex is mostly relieved and the spandex becomes stable at a new and lower denier. Heat setting temperatures for spandex are generally in the range of 175° C. to 200° C. Heat setting conditions for conventional spandex are for about 45 seconds or more at about 190° C.

In conventional fabrics, if heat setting is not used to "set" the spandex, the fabric may have high shrinkage, excessive fabric weight, and excessive elongation, which may result in a negative experience for the consumer. Excessive shrinkage during the fabric finish process may result in crease marks on the fabric surface during processing and household washing. Creases that develop in this manner are frequently very difficult to remove by ironing.

By eliminating the high-temperature heat setting step in the process, the new process may reduce heat damage to certain fibers (i. e. cotton) and thus may improve the handle of the finished fabric. The fabrics of some embodiments may be prepared in the absence of a heat setting step including where the fabrics will be prepared into garments. As a further benefit, heat sensitive hard yarns can be used in the new process to make shirting, elastic, fabrics, thus increasing the possibilities for different and improved products. In addition, the shorter process has productivity benefits to the fabric manufacturer.

According to some aspects, the elastic yarn of the ground yarns inside the fabric is non-elastomeric elastic fiber. The content of non-elastomeric elastic yarn is higher than 5% and lower than 65% of total fabric weight.

The non-elastomeric elastic fibers can be textured PET stretch filament, textured PPT stretch filament, bi-component fiber, or PBT stretch fiber. It was surprise to find that when the non-elastomeric elastic fibers with recoverable stretch higher than 15% were used in ground yarn the fabric change dramatically. The fabrics have high stretch and high recovery power. The linear density of the non-elastomeric elastic fibers can range from about 15 denier (16.5 dtex) to about 450 denier (495 dtex), including from about 30 denier to 150 denier (33 dtex to 165 dtex). When the denier is too high, the fabric could have substantial grin through.

As compared with elastomeric yarn, non-elastomeric yarn has higher stretch modulus. Under the same load force, non-elastomeric yarn is stretched out less and restrains the extension of the fabric, which prevents the fabrics from the excessive elongation. Non-elastomeric yarn also has higher recovery power than bare elastomeric fibers. The innovative circular knit fabrics disclosed herein show high recovery force which makes the fabrics easier to recover their original shape during wearing, with less deformation.

Normally, non-elastomeric yarn has better chemical resistance than spandex fiber, such as, but not limited to, chlorine resistance. The innovative fabrics herein also have better chemical resistance than conventional fabrics. In addition, the heatset process can be avoided for the present innovative fabric containing non-elastomeric fiber.

Polyester bi-component fiber is a preferable option for use as elastic fiber in ground yarns. The polyester bicomponent filament comprise poly(trimethylene terephthalate) and at least one polymer selected from the group consisting of polyethylene terephthalate), poly(trimethylene terephthalate), and poly(tetramethylene terephthalate) or a combination of such members, having an after heat-set crimp contraction value of from about 10% to about 80%.

The stretch ratio of polyester bi-component fiber is normally 1.01× times to 1.25× times compared to the unstretched fiber during knitting. Too low a stretch ratio will result in low quality yarns having grin-through and an uncentered bicomponent filament. Too high a stretch ratio will result in breakage of the bicomponent filament and core void. The non-elastomer fiber content with circular knit fabric with two elastic yarns are between about 5% to about 85%, including from about 5% to about 45%, from about 8% to about 35%, and about 10% to about 30% based on the weight of the fabric According to one nonlimiting embodiment, the elastomeric yarn and the non-elastomeric elastic yarn are knitted together to form a jersey loop base of the fabric, wherein the two elastic fibers are stretched to different drafts of its original length during knitting process. The draft of elastomeric yarn can be selected between drafts 1.8× times to 5.0× times, while the draft of non-elastomeric yarn can be selected from 1.01× to 1.35×.

According to one nonlimiting embodiment, the elastomeric yarn and the non-elastomeric elastic yarn are knitted together to form a jersey loop base of the fabric.

An outstanding benefit of circular knit fabrics with double elastic yarn is that this innovative fabric can be made with the combination performance and appearance of woven and knit fabrics. As compared with circular knit fabrics, woven fabric has high recovery force and better shape retention, but is less soft and less flexible. Surprisingly, the circular knit fabrics with double elastic fibers can be made with woven stiff appearance and good shape retention by adjusting the draft ratio, the plating position and relative location of two elastic yarns and hard yarns. Combined with soft touch and high flexibility, the circular knit fabrics also have high modular, good shape retention and other woven characters.

The non-elastomeric elastic fibers can be textured PET stretch filament, textured PPT stretch filament, bi-component fiber (such as PET/PTT side-by-side bicomponent), or PBT stretch fiber. The linear density of the non-elastomeric elastic fibers can range from about 15 denier (16.5 dtex) to about 600 denier (660 dtex), including from about 30 denier to 150 denier (33 dtex to 165 dtex).

The non-elastomer fiber content with circular knit fabric with two elastic yarns are between about 5% to about 85%, including from about 5% to about 45%, about 8% to about 35%, and about 10% to about 30% based on the weight of the fabric. Elastomeric fiber content within the fabric may be from about 0.5% to about 20% by weight based on the total fabric weight, including from about 1% to about 5%.

In conventional stretch circular knit fabrics, the fabric has higher stretch level in cross-machine direction (course direction) than in machine direction. Because of long float length and high ratio of float count vs loop count of effect yarn, the present fabric has better stretch balance between the machine direction and machine across direction. The stretch level in machine direction is limited and blocked by the straight float lengths thereby reducing the sagging and bagging defect of normal circular knit fabrics as used in pants and fabrics such as denims.

The hard base yarn included in some nonlimiting embodiments of these innovative fabrics can be, for example, spun staple yarns, such as cotton, wool or linen, and their filaments. Hard base yarns may also comprise mono component poly(ethylene terephthalate) and poly(trimethylene terephthalate) fiber, polycaprolactam fiber, poly(hexamethylene adipamide) fibers acrylic fibers, modacrylic, acetate fibers, rayon fibers, Nylon and combinations thereof.

The ratio of float count to loop count may be from about 1:1 to about 6:1. Other acceptable ratios of the base ends to core ends may be from about 1:1 to about 3:1. If the ratio is too low, the loop portion is too long and the extension of the fabric cannot be restrained firmly, thereby resulting in undesirable deformation during garment wearing. It is found herein that the flat segments of the effect yarn float in fabric surface can block the excess extension of the fabric in course direction during wearing. Accordingly, adjusting float ratio is helpful to reduce the fabric deformation while in use.

The innovative fabrics herein also have excellent stretch level and recovery power both in width and length direction due to long loop existing in the hybrid fabric. In width direction, the flat loops provide high recovery efficiency vs. traditional single jersey structure with circle loop in each wale. Also, in length direction, the effect yarns directly float over the base yarn without knitting. In these areas, base yarns have large loop length, which provide big space for the yarn stretch out and recovery back in length direction.

The shift count decides the twill line angles. High shift counts can result in steep diagonal line with large diagonal line. The preferable shift count is 1 for most of twill fabrics. The shift line can also have different directions, with right hand twill or left hand twill.

Several knit stitch forms can be used in intermeshing points for binding connection between effect yarn and base yarn. Examples include, but are not limited to, knit stitches, knit loops and tuck loops. One nonlimiting example is knit loop structure, as demonstrated in FIG. 1 and FIG. 3. The knit loop is produced by clearing the old loop below the latch by raising the needle and feeding a new loop into the hook during the knitting process. Such pattern offers flat, tight, and thin intermesh structure. The fabric feels softer as well.

Figure 8:
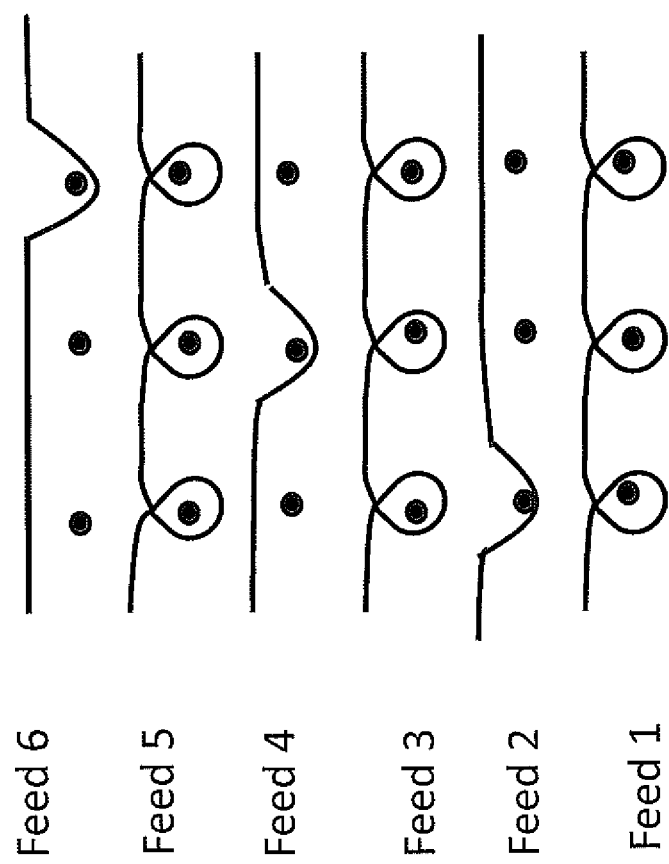
FIG. 8 is a diagrammatic form of stitch notation for a repeat of circular knitting with 1/2 right hand twill structure. The stitch loops in intermeshing points are tuck loops.

Another nonlimiting example of knit stitch form is tuck loop, as shown in FIG. 8. In tuck loop structure, a length of the yarn is received by a needle but not pulled through the loop of the previous course during the knitting operation. In this embodiment, a tuck stitch is formed when a needle receives a new yarn without losing its old loop. This results in two yarns being held in the hook. The held loop plus the new yarn will form the tuck loop. The tuck loop is typically shaped like an inverted "U". A tuck loop makes knit fabric which is thicker and less extensible.

Grin-through refers to the exposure of the loop structure of the ground yarns on the fabric surface. Grin-through can manifest itself visibly as an undesirable glitter or to the touch as different color and lust. Grin-through becomes more apparent after the yarns and fabrics are dyed. In most cases, the effect yarn, for example cotton, is different from the ground yarn, such as polyester bi-component or elastic filament. The dye material and dye processing conditions are different for cotton as compared to polyester and spandex. Normally, cotton is dyed through reactive, vat, or direct dyeing at a temperature below 100° C., while polyester is dyed with a disperse dye at a temperature above 100° C. When an elastic circular knit with a spandex and a polyester bicomponent is dyed under conditions optimal for the surface effect yarn, but not optimal for the polyester bicomponent non-elastic yarn, the polyester bicomponent filaments cannot pick up the dyestuff and maintain the desired color. As a result, grin-through often becomes more apparent after the dyeing step.

According to one nonlimiting embodiment, in order to hide the ground yarns inside the fabric by the adjacent effect yarns, the effect yarns are required to have at least the same denier as the ground yarns. Desirably, the effect yarns have a greater denier than the ground yarns. We have found herein that when the denier ratio of effective yarns vs. ground yarns is higher than 1:1, the ground yarns are substantially not visible on the fabric surface. Accordingly, the ratio of yarn denier of effect yarns to the ground yarns is preferably from about 1:1 to about 10:1, including, but not limited to, from about 1.5:1 to about 2.0:1.

According to another nonlimiting embodiment, the ground yarns are exposed in both surface and back side of the fabric for hand feel and color appearance purposes. In this embodiment, the denier ratio of effective yarns vs. ground yarns is smaller than 1:1 and the ground yarns are substantially visible on both sides of the fabric. The ratio of yarn denier of effect yarns to the ground yarns in this embodiment is from about 0.3:1 to about 10:1, including from about 0.5:1 to about 2.0:1.

During the knitting process, grin-through may be caused by improper alignment and plating of the hard yarn or elastic yarn. Proper alignment and plating of the hard yarn and elastic yarns can effectively control the grin-through. For a circular knit, the appropriate gauge of knitting machine, draft ratio between two elastic yarns, the plating position of the yarns, the denier and count of the yarns should be selected to optimize the grin-though.

Circular knit machines, flat knit machines, and seamless knit machines including but not limited to the Santoni seamless machine, can be used to make circular knit fabrics with woven look and performance with high stitch forming precision in accordance with this innovation.

When Santoni's seamless machine is used, the different elastic yarn denier and drafts can be used in different portions of the garment. The garment exalts the body anatomy by using elastic yarn with graduated compressions. Santoni's machines have the capable of producing shaped panels with woven alike surface. A wide variety of fabric structures and garments can be produced in a variety of diameters on circular knitting machines. Stitch structures such as tucks, floats, and false ribs, the lengths of stitches and unbalancing the structures are used to modify the shape of a tube.

While this technology is focused towards causal and leisurewear, seamless fabrics with woven alike surface also could be used in outer wear, such as denim in jeans. The denier of the elastic yarns and the knit patterns also can change in different portions of the garment. For example, in order to have better holding force in certain critical areas, such as the knee, inner thigh and front panel of pants, heavier denier and higher draft of elastomeric yarn is applied. In these areas, the garment has higher shaping function and high strain force. In other portions, less stretch and strain is applied which provides better comfort. Accordingly, with the present innovation, fine quality comfort garments can be produced with spot shaping functions at critical areas.

Figure 9:
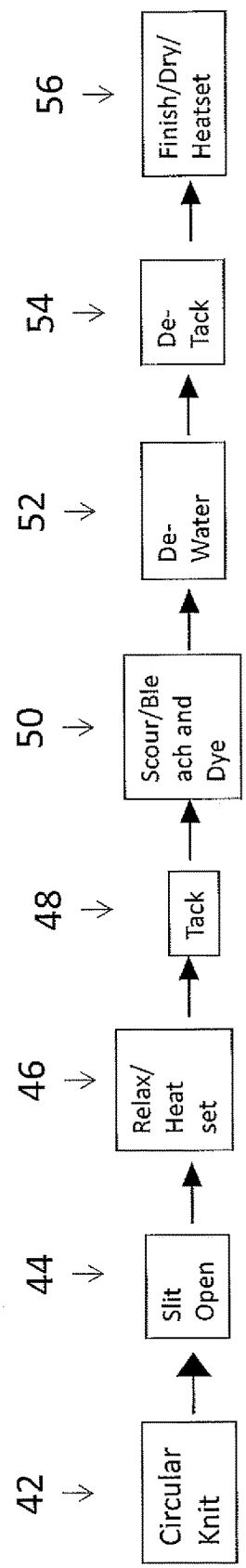
FIG. 9 is a flow chart showing the finish process steps for circular knit fabrics with woven surface.

The steps for finishing elastic circular-knit fabrics are outlined in FIG. 9. After the fabric is knitted, most in the form of a tube, it is collected under the knitting machine either as a roll on a rotating mandrel, as a flattened tube, or in a box after it is loosely folded back and forth. In open-width finishing, the knitted tube is slit open 44 and laid flat. The open fabric is subsequently relaxed 46, either by subjecting it to steam, or by wetting it by dipping and squeezing (padding). The relaxed fabric is then applied to a tenter frame and heated (for heat setting 46) in an oven. The tenter frame holds the fabric on the edges by pins, and stretches it in both the length and width directions in order to return the fabric to desired dimensions and basis weight. If wet, the fabric is first dried. Heat setting is then accomplished before subsequent wet processing steps. Consequently, heat setting is often referred to as "pre-setting" in the trade. At the oven exit, the flat fabric is released from the stretcher and then tacked 48 (sewed) back into a tubular shape. The fabric then is processed in tubular form through wet processes 50 of cleaning (scouring) and optional bleaching/dyeing, e.g., by soft-flow jet equipment, and then de-watered 52, e.g., by squeeze rolls or in a centrifuge. The fabric is then "de-tacked" 54 by removing the sewing thread and re-opening the fabric into a flat sheet. The flat, still wet, fabric is then dried 56 in a tenter-frame oven under conditions of fabric overfeed (opposite of stretching) so that the fabric is under no tension in the length (machine) direction while being dried at temperatures below heat setting temperatures. The fabric is slightly tensioned in the width direction in order to flatten any potential wrinkling. An optional fabric finish, such as a softener, may be applied just prior to the drying operation 56. In some cases, a fabric finish is applied after the fabric is first dried by a belt or tenter-frame oven so that the finish is taken up uniformly by fibers that are equally dry. This extra step involves re-wetting the dried fabric with a finish, and then drying the fabric again in a tenter-frame oven.

In one nonlimiting embodiment, fabric may have an elongation from about 10% to about 250% in the wales and/or course direction. The fabrics may have shrinkage of about 15% or less, for example less than 7% in both the length and width directions, during washing. The stretch fabric may have an excellent cotton hand feel. Garments may be prepared from the fabrics described herein.

When cotton yarn is pre-dyed with indigo, the fabric has a woven denim or jean look. With no grin-through, little non-elastomeric yarn and elastomeric yarn are exposed on the fabric surface. Thus, it is not necessary to dye the two elastic yarns thereby reducing the manufacture cost. Further, by arranging knit points in different direction, the fabric can be made with right hand twill or left hand twill as demonstrated in FIG. 3 and FIG. 4.

Denim, an indigo dyed woven fabric, has enjoyed popularity in the fashion industry at least partly due to the ring dyeing process used in creating the indigo yarns. In general, indigo dye is located close to the surface of the yarns, leaving the core of the yarn undyed. Because the dye is located at the surface of the yarns, denim fabrics fade differently than fabrics made from non-ring dyed yarns. Different finishing techniques can be applied to denim to take advantage of these ring dyed yarns. For example, denim can be hand scraped, sand blasted, stone washed, or treated in other ways that allow varying amounts of the undyed cores of the indigo yarns to become visible. The effects created through these treatments have made denim a popular and fashionable fabric in the clothing and textile industries.

The innovative fabric herein can be dyed in fabric form or in garment form. Examples of garment treatments include, but are not limited to, in scouring, stone washing, sand blasting, bleaching, garment dye and laser process. Due to low grin-through of these fabrics, we can dye only hard yarns during fabric and garment dyeing. Dyeing of the elastic yarns is not required.

Analytical Methods:
Recoverable Stretch of Yarn

The recoverable stretch of elastic fibers used in the Examples was measured following ASTM D6720-07. Each yarn sample was formed into a skein of 5000+/−5 total denier (5550 dtex) with a skein reel at a tension of about 0.1 gpd (0.09 dN/tex). The skein was then immersed into boiling water for 15 minutes at 100° C. degree water, after which the skein were removed from the water. Then, the skein was conditioned at 70° F. (+/−2° F.) (21°+/−1° C.) and 65% (+/−2%) relative humidity for a minimum of 16 hours for air dry.

The skein was hung substantially vertically from a stand. After three times cycling with 1030 grams hanging weight, a 1030 gram weight (206 mg/d; 185.4 mg/dtex) was hung from the bottom of the skein, and the length of the skein was measured to within 1 mm and recorded as "$L_1$". Next, a 6 mg/den (5.4 mg/dtex) weight (e.g. 30 grams for a 5550 dtex skein) was hung on the bottom of the skein, the weighted skein was allowed to come to an equilibrium length, and the length of the skein was measured to within 1 mm and recorded as "$L_2$". Yarn recoverable stretch (percent), "$CC_a$", was calculated according to the formula $CC_a(\%)=100*(L_1-L_2)/L_2$.

Spandex Draft

The following procedure is used to measure the elastic yarn drafts in the Examples. A yarn sample of at least 200 stitches (needles) from a single course, marked at beginning and end, is unraveled or de-knitted and separated into elastic yarn and hard yarns. Each sample (elastic yarn or hard yarn) is hung freely by attaching one end onto a meter stick with one marking at the top of the stick. A weight is attached to each sample (0.1 g/denier for hard yarn, 0.001 g/denier for spandex). The weight is lowered slowly, allowing the weight to be applied to the end of the yarn sample without impact. The length is measured between the marks and record. The measurements are repeated for 5 samples each of elastic yarn and hard yarn. The average draft is calculated according to the following formula:

Draft=(Length of hard yarn between marks)÷(Length of elastic yarn between marks).

Spandex Fiber Content

Knit fabrics are de-knit manually. The spandex is separated from the companion hard yarn and weighed with a precision laboratory balance or torsion balance. The spandex content is expressed as the percentage of spandex weight to fabric weight.

Fabric Elongation (Stretch)

Fabrics are evaluated for % elongation under a specified load (i.e., force) in the fabric stretch direction(s), which is the direction of the composite yarns (i.e., weft, warp, or weft and warp). Three samples of dimensions 60 cm×6.5 cm were cut from the fabric. The long dimension (60 cm) corresponds to the stretch direction. The samples are partially unraveled to reduce the sample widths to 5.0 cm. The samples are then conditioned for at least 16 hours at 20° C.+/−2° C. and 65% relatively humidity, +/−2%.

A first benchmark was made across the width of each sample, at 6.5 cm from a sample end. A second benchmark was made across the sample width at 50.0 cm from the first benchmark. The excess fabric from the second benchmark to the other end of the sample was used to form and stitch a loop into which a metal pin could be inserted. A notch was then cut into the loop so that weights could be attached to the metal pin.

The sample non-loop end was clamped and the fabric sample was hung vertically. A 17.8 Newton (N) weight (4 LB) is attached to the metal pin through the hanging fabric loop, so that the fabric sample is stretched by the weight. The sample was "exercised" by allowing it to be stretched by the weight for three seconds, and then manually relieving the force by lifting the weight. This cycle was carried out three times. The weight was allowed then to hang freely, thus stretching the fabric sample. The distance in millimeters between the two benchmarks was measured while the fabric was under load, and this distance is designated ML. The original distance between benchmarks (i.e., unstretched distance) was designated GL. The % fabric elongation for each individual sample as calculated as follows:

$$\% \text{ Elongation}(E \%) = ((ML - GL)/GL) \times 100$$

The three elongation results were averaged for the final result.

Fabric Growth (Unrecovered Stretch)

After stretching, a fabric with no growth should recover exactly to its original length before stretching. Typically, however, stretch fabrics will not fully recover and will be slightly longer after extended stretching. This slight increase in length is termed "growth."

The above fabric elongation test must be completed before the growth test. Only the stretch direction of the fabric was tested. For two-way stretch fabric both directions were tested. Three samples, each 55.0 cm×6.0 cm, were cut from the fabric. These were different samples from those used in the elongation test. The 55.0 cm direction should correspond to the stretch direction. The samples were partially unraveled to reduce the sample widths to 5.0 cm. The samples were conditioned at temperature and humidity as in the above elongation test. Two benchmarks exactly 50 cm apart were drawn across the width of the samples.

The known elongation % (E %) from the elongation test was used to calculate a length of the samples at 80% of this known elongation. This was calculated as $$E(\text{length}) \text{ at } 80\% = (E \%/100) \times 0.80 \times L,$$

where L was the original length between the benchmarks (i.e., 50.0 cm). Both ends of a sample were clamped and the sample was stretched until the length between benchmarks equaled L+E (length) as calculated above. This stretch was maintained for 30 minutes, after which time the stretching force was released and the sample was allowed to hang freely and relax. After 60 minutes the % growth was measured as $$\% \text{ Growth} = (L2 \times 100)/L,$$

where L2 was the increase in length between the sample benchmarks after relaxation and L was the original length between benchmarks. This % growth was measured for each sample and the results averaged to determine the growth number.

Fabric Recovery

Fabric recovery means that fabric is capable of recovery to its original length after deformation from elongation or tension stress. It is expressed as a percentage ratio of the increased extended length of a fabric under tension to the length of the fabric following release of elongation or tension stress. It can be calculated from fabric stretch and fabric growth.

Fabric Shrinkage

Fabric shrinkage was measured after laundering. The fabric was first conditioned at temperature and humidity as in the elongation and growth tests. Two samples (60 cm×60 cm) were then cut from the fabric. The samples were taken at least 15 cm away from the selvage. A box of four sides of 40 cm×40 cm was marked on the fabric samples.

The samples were laundered in a washing machine with the samples and a loading fabric. The total washing machine load was 2 kg of air-dried material, and not more than half the wash consisted of test samples. The laundry was gently washed at a water temperature of 40° C. and spun. A detergent amount of 1 g/l to 3 g/l was used, depending on water hardness. The samples were laid on a flat surface until dry, and then they were conditioned for 16 hours at 20° C.+/−2° C. and 65% relative humidity+/−2% rh.

Fabric sample shrinkage was then measured in the warp and weft directions by measuring the distances between markings. The shrinkage after laundering, C %, was calculated as $$C \% = ((L1 - L2)/L1) \times 100,$$

where L1 was the original distance between markings (40 cm) and L2 is the distance after drying. The results are averaged for the samples and reported for both weft and warp directions. Negative shrinkage numbers reflect expansion, which was possible in some cases because of the hard yarn behavior.

Fabric Weight

Woven Fabric samples were die-punched with a 10 cm diameter die. Each cut-out woven fabric sample was weighed in grams. The "fabric weight" was then calculated as grams/square meters.

Fabric Recovery Force

The fabric is cut with 3×8 inches. By using a fabric marking pen, draw benchmark "A" one inch from one edge of each specimen. Draw benchmark "B" six inched from bench mark "A", resulting in two benchmarks that are six inches apart. Sew the fabric specimens into a loop by folding the two short edges together such that the benchmarks line up and sewing a straight seam across the marks. Condition the test loops for at least 16 hours at 70° F. temperature and 65% relative humidity. Exercise the specimens in Instron machine with three cycling by extending to 75% elongation at 200% per minute and release. The fabric unload force at 30% elongation in third cycle is recorded as fabric recovery force. Fabric recovery force represents the fabric recovery power during garment wearing.

The features and advantages of the present invention are more fully shown by the following examples which are provided for purposes of illustration, and are not to be construed as limiting the invention in any way.

EXAMPLES

The following examples demonstrate the present invention and its capability for use in manufacturing a variety of fabrics. The invention is capable of other and different embodiments, and its several details are capable of modifications in various apparent respects, without departing from the scope and spirit of the present invention. Accordingly, the examples are to be regarded as illustrative in nature and not as restrictive.

Example 1

Fabric Production

Circular knit (CK) elastic single jersey fabrics with two elastic yarns plated with hard yarn for the examples are knit on Monarch Circular Knitting Machine Model VX-RDS, with 26 inch cylinder diameter, 28 gauge (needles per circumferential inch) and 2232 needles, and 42 yarn feed positions. The circular knit machine is operated at 16 revolutions per minute (rpm). The spandex feed tension is measured between the spandex supply package 36 and the roller guide 37 (FIG. 5) with an Iro Memminger digital tension meter, model number, MER2. For the following examples, the spandex feed tensions are maintained at 4 and 7 grams for 40 and 70-denier spandex. These tensions are sufficient for reliable and continuous feeding of the spandex yarn to the knitting needles. When the feed tensions are too low, the spandex yarn wraps around the roller guides at the supply package and cannot be reliably fed to the circular knitting machine. The tension device for non-elastomeric elastic yarn and hard yarn is IRO Memminger with MPF40 KIF model. The tension for non-elastomeric yarn is around 8~9 grams. The tension for hard yarn is about 6~7 grams.

CK denim fabric with two elastic yarns plated with cotton yarn for the examples are knit on Monarch Circular Knitting Machine Model F-SEC-U/ST electric Jacque machine, with 32 inch cylinder diameter, 28 gauge (needles per circumferential inch) and 2958 needles, and 48 yarn feed positions. The circular knit machine is operated at 16 revolutions per minute (rpm). The spandex feed tension is measured between the spandex supply package 36 and the roller guide 37 (FIG. 5) with an Iro Memminger digital tension meter MPF40GIF, model number, MER10. For the following examples, the spandex feed tensions are maintained at 4 and 7 grams for 40 and 70-denier spandex. The tension for non-elastomeric yarn is around 8~9 grams. The tension for hard yarn is about 6~7 grams.

Seamless fabric Examples of the invention made by circular knitting using a SMA-8-TOP seamless, 28 inch body size, knitting machine from SANTONI (from GRUPPO LONATI, Italy) (hereinafter, "the SANTONI knitting machine"). In making the innovative fabrics, a combination of different knitting constructions using various types of yarns was used. The machine has 8 yarn feed positions. It operated at 70 revolutions per minute (rpm). The spandex feed tension is measured with an BTSR® digital tension meter, model number, KTF-100HP. For the following examples, the spandex feed tensions are maintained at 1 gram for each 10 denier spandex. The tension device for non-elastomeric elastic yarn and hard yarn is IRO Memminger with model Rai Tricot.

The knitted fabrics are preheated, scoured, dyed and dried. For seamless fabric, the fabrics go through the finish process without heatset. Fabrics are scoured and bleached in a 100-liter solution at 100° C. for 30 minutes. All such wet, jet finishing, dyeing, is done in a Thies, horizontal jet dye machine with soft flowers. The fabric was pre-scoured with a water solution containing Domoscour LFE810 (13 g) (scouring and emulsifying agent, made by M.Dohmen Company), Lurotex A-25 (100 g) (hydrophilic finishing and softener, made by BASF Cooperation) at 49° C. for 5 minutes.

The fabrics are dyed at 85° C. for 60 minutes, using direct dyestuffs and other constituents. The dye solution contained Solophenyl FGE 250 (made by Huntsmen Corp.) 85.8 grams, 0.5 weight % trisodium phosphate (adjusting PH), and common salt 45000 grams. Then, Burcofix 195 (color fixation made from M. Dohmen Company) 78 grams and Ultratex MES 65 grams and acetic acid 10 grams are added into the dyebath and run at 45° C. for 30 minutes. The bath is again drained and the fabrics are unloaded from the vessel. The fabrics are then dried in a tenter (made by Kenyon Company) oven at 145° C. for about 30 seconds.

Table 1 and Table 2 list the materials and process conditions that were used to manufacture the fabric samples with elastomeric and non-elastomeric elastic yarns. Elastic yarn is available from Invista, s. á. r. L., of Wilmington, Del. and Wichita, Kans. In the column headed elastic fiber of Table 1, 40d means 40 denier; and 3.3× means the draft of the elastic imposed by the core spinning machine (machine draft). In the column headed 'Hard Yarn', of Table 1, 16's is the linear density of the spun yarn as measured by the English Cotton Count System. All other items in these Tables are clearly labeled.

TABLE 1

Fabric Examples 1C through Example 16

| Example | Effect yarns | Ground yarn | Elastic fiber draft, spandex + Polyester Bi-componenton | Elastic Fiber content % by fabric weight, Spandex + Polyester Bi-componenton fibe | knit loop structrue on fabric base | Weave pattern on fabric surface |
|---|---|---|---|---|---|---|
| 1c | No | 30S cotton + 40d T162B LYCRA ® fiber | 3.3X + No | 7.7% + 0 | single jersey | single jersey |
| 2 | Two ends 30S cotton | 150D/68fLYCRA ® T400 ® fiber | No + 1.05X | 0 + 49.5 | single jersey | ½ right twill |
| 3 | Two ends 30S cotton | 225D/102fLYCRA ® T400 ® fiber | No + 1.05X | 0 + 59.6 | single jersey | ½ right twill |
| 4 | 16s Indigo | 75D/34fLYCRA ® T400 ® fiber core spun with 16S cotton | No + 1.05X | 0 + 18.7 | single jersey | ⅓ right twill |
| 5 | 16s Indigo | 50D/34fLYCRA ® T400 ® fiber plated with 20S cotton | No + 1.10X | 0 + 9.6 | single jersey | ⅓ right twill |
| 6 | Two ends 30S cotton | 70d T162B LYCRA ® fiber + 75D/34fLYCRA ® T400 ® fiber | 3.0X + 1.05X | 15 + 22.5 | single jersey | ½ right twill |
| 7 | Double ends of 24s cotton | 30d T162B LYCRA ® fiber + 75D/72f PET fiber | 2.0X + No | 4.3 + 0 | single jersey | ½ left twill |
| 8 | Double ends of 24s cotton | 30d T162B LYCRA ® fiber + 75D/34fLYCRA ® T400 ® fiber | 20.X + 1.10X | 4.3 + 21.4 | single jersey | ½ left twill |
| 9 | Double ends of 32s cotton | 30d T162B LYCRA ® fiber + 75D/72f PET fiber | 2.0X + No | 5 + 0 | single jersey | ½ left twill |
| 10 | Double ends of 32s cotton | 30d T162B LYCRA ® fiber + 75D/34fLYCRA ® T400 ® fiber | 2.0X + 1.10X | 5 + 25.2 | single jersey | ½ left twill |
| 11 | double 20s cotton | 40d T162B LYCRA ® fiber + 75D/34fLYCRA ® T400 ® fiber | 3.0X + 1.10X | 6.5 + 22.3 | single jersey | ½ leftt twill |

TABLE 1-continued

Fabric Examples 1C through Example 16

| | | | | | | |
|---|---|---|---|---|---|---|
| 12 | double 32s cotton | 40d T162B LYCRA ® fiber + 75D/34fLYCRA ® T400 ® fiber | 3.0X + 1.10X | 6.5 + 24.6 | single jersey | ½ left twill |
| 13 | 16s Indigo | 40D T562B LYCRA ® fiber + 75D/34fLYCRA ® T400 ® fiber air covered | 3.3X + 1.08X | 5.9 + 35.4 | single jersey | ⅓ right twill |
| 14 | 16s Indigo | 40D T562B LYCRA ® fiber + 75D/34fLYCRA ® T400 ® fiber + core spun with 16S cotton | 3.3X + 1.08X | 3.5 + 19.6 | single jersey | ⅓ right twill |
| 15 | 16s Indigo | 40D T562B LYCRA ® fiber + 75D/34fLYCRA ® T400 ® fiber | 3.3X + 1.08X | 5.9 + 32.9 | single jersey | ⅓ right twill |
| 16 | 16s Indigo | 40D T562B LYCRA ® fiber + 75D/34fLYCRA ® T400 ® fiber + 20S cotton plated | 3.3X + 1.08X | 3.9 + 18.7 | single jersey | ⅓ right twill |

| Example | knit machine | Heatset Process | Fabric Weight g/m^2 | Available Elongation, % Length × Width | Fabric Growth %, Length × Width | Fabric Recovery %, Length × Width | Shrinkage, %, Length × Width |
|---|---|---|---|---|---|---|---|
| 1c | Single jersey | preheatset | 5.0 | 80.9 × 219.2 | 10.5 × 5.1 | 83.8 × 84.4 | −5.32 × −1.57 |
| 2 | Jaquard jersey | preheatset | 9.7 | 49.5 × 40 | 4.7 × 5.6 | 88.1 × 82.5 | −4.30 × −0.39 |
| 3 | Jaquard jersey | preheatset | 12.6 | 25.6 × 17.5 | 2.8 × 2.5 | 86.3 × 82.1 | −1.43 × −0.65 |
| 4 | Single jersey | Pre-heatset, Beam Scour | 9.0 | 38 × 30 | 6.0 × 3.5 | 80.3 × 85.5 | −7.2 × −2.2 |
| 5 | Single jersey | Pre-heatset, Beam Scour | 11.2 | 37 × 25 | 3.0 × 1.0 | 89.9 × 95 | −3.5 × −5.1 |
| 6 | Jaquard jersey | preheatset | 12.2 | 106.3 × 39.6 | 2.6 × 3.7 | 96.7 × 88.3 | −2.73 × −0.78 |
| 7 | Jaquard jersey | preheatset | 10.6 | 99.3 × 58.8 | 6.2 × 4.9 | 92.2 × 89.6 | −7.22 × −2.2 |
| 8 | Jaquard jersey | preheatset | 10.9 | 102 × 52.0 | 3.7 × 3.5 | 95.5 × 91.6 | −4.3 × −2.8 |
| 9 | Jaquard jersey | preheatset | 9.2 | 121.6 × 69.2 | 6.0 × 5.2 | 93.8 × 90.6 | −3.5 × −5.1 |
| 10 | Jaquard jersey | Partial heatset | 9.3 | 138.5 × 59.2 | 3.6 × 4.0 | 96.8 × 91.6 | −4.6 × −2.8 |
| 11 | Santoni Seamless | No heatset | 11.6 | 206.9 × 119.2 | 4.8 × 4.2 | 97.1 × 95.6 | −21.16 × −12.34 |
| 12 | Santoni Seamless | No heatset | 11.5 | 245.1 × 132.4 | 3.9 × 4.4 | 98.0 × 95.8 | −10.32 × −3.10 |
| 13 | Single Jersey | Pre-heatset, Beam Scour | 8.7 | 146 × 92 | 2.5 × 3.0 | 97.8 × 95.2 | −7.6 × −3.7 |
| 14 | Single Jersey | Pre-heatset, Beam Scour | 10.9 | 49 × 24 | 3.3 × 1.4 | 91.6 × 92.7 | −5.4 × −2.2 |
| 15 | Single Jersey | Pre-heatset, Beam Scour | 11.0 | 150 × 62 | 2.5 × 2.6 | 97.9 × 94.8 | −4.3 × −2.8 |
| 16 | Single Jersey | Pre-heatset, Beam Scour | 11.2 | 74 × 35 | 3.2 × 2.9 | 94.6 × 89.6 | −4.7 × −2.6 |

Example 1C

A conventional stretch circular knit fabric was used as a control. This control fabric is made by a 30S cotton ring spun yarn and a 40D LYCRA® fiber with 2.7× draft through plating together side by side. The fabric has high stretch in both wales and course directions. Particularly in course direction, the stretch level reaches to 219.2%. This fabric is good for T-shirt and top garment applications, but not for bottom weight fabrics, such as jeans and pants.

Example 2

The effect yarn is two-ends of 32S cotton yarn. The elastic fiber in ground yarn is 150D/34f polyester bi-component yarn. No hard yarn exists in ground yarn. The fabric stretch is 49.5% and 40.2% in wales and course direction with low growth (4.7%×5.6% in wale×course direction). The fabric surface has 1/2 twill and jersey loop base is plain single jersey. This knit fabric has woven look and performance, and is suitable to be used for jeans.

Example 3

The only difference in this sample from Example 2 is the denier of elastic fiber. 225D/102f LYCRA® T400® polyester bi-component fiber is used. In this sample, other material and structures are the same as Example 2. It is clear that after heavier denier elastic yarn is used, the fabric stretch reduced, but the fabric recovery increases. The growth is 2.8% and 2.5% in wale and course direction, respectively, which are excellent even for woven fabrics.

Example 4

This fabric sample is a denim circular knit fabric with wovens performance. The elastic yarn is 75D/34f LYCRA® T400® polyester bi-component fiber with 23.6% content of total fabric weight. The LYCRA® T400® polyester bicomponent fiber is covered with 16s cotton through core spun method before knitting. There is no grin-through of jersey loop base on the fabric surface, which is 3/1 twill woven look. The effect yarn is pre-dyed indigo yarn, so the fabric looks like woven denim.

Example 5

In this fabric, the ground yarns include 50D LYCRA® T400® fiber and 20S cotton. Two yarns are plated into fabric and knit into a single jersey. The effect yarn is 16S indigo pre-dyed cotton yarn. The content of elastic fiber in fabric is 11.2%. The fabric has woven alike stretch level, and the fabric growth and shrinkage are also very low. The fabric has good cotton touch and appearance.

Example 6

The fabric is made with 2-ends of 32S cotton yarn as effect yarn and two kinds of elastic yarns as ground yarn to knit into the jersey loop base. The fabric surface has 1/2 right twill appearances. Due to the use of two elastic yarns within one fabric, the fabric has excellent stretch and recovery in vertical and horizontal direction. It is a perfect fabric for making legging jeans.

Example 7

This fabric is made up with 2 ends of 24S cotton yarn as effect yarn. The ground yarns contain a 30D LYCRA® fiber with 75D134f textured polyester. The fabric stretch and recovery are acceptable. The fabric surface has 1/2 left twill patterns.

Example 8

This fabric is also made up with 2 ends of 24S cotton yarn as effect yarn. The ground yarns contain a 300 LYCRA® fiber with a 75D/34f LYCRA® T400® polyester bi-component fiber. The only difference between this fabric and Example 7 is that the 75D/34f LYCRA® T400® polyester bi-component fiber is used, while 75D polyester texture polyester is used in Example 7. The LYCRA® T400® polyester bi-component fiber reduced the fabric growth and increased the recovery of fabric significantly.

Example 9

The effect yarn is 2-ends of 32S cotton. Other structures and materials are the same as Example 7. As compared with Example 7, thin effect yarn provides the fabric with lighter weight and slightly better recovery.

Example 10

In this fabric, the 75D/72f polyester is replaced by a 75D134f LYCRA® T400® polyester bi-component fiber. The test data in the table show that LYCRA® T400® fiber could increase the fabric recovery and reduce the fabric growth.

Example 11

This fabric was made in a Santoni seamless machine. The fabric is not heatset. The effect yarn is 2-ends of 20s cotton. The ground yarns are made by two different elastic yarns: 40D LYCRA® spandex fiber and 75D/34f LYCRA® T400® polyester bi-component fiber. The fabric can be made with different stretch level and different recovery power in different locations in the garment, such as in the knee, thigh and butt portions.

Example 12

This fabric is also made by a Santoni seamless machine. The ground yarn is 2-ends of 32S cotton yarn. The fabric stretch is high and the recovery is good. The localized high stretch or high recovery areas in some parts of the garment can also be made through various stitch, elastic yarn deniers and drafts.

Example 13

This fabric surface is made with 16S pre-dyed indigo yarn. The ground yarns comprise two elastic yarns: 40D LYCRA® spandex fiber and 75D/34f LYCRA® T400® polyester bi-component fiber. These two elastic yarns are combined together through an air covering process before knitting. The interlaced yarns are fed into the machine as one thread and form a single jersey knit as the fabric base. The fabric test results as listed in Table 2 show that this fabric has high stretch and very good recovery (97.8%×95.2%) in wale and course direction, respectively.

Example 14

The yarns used in this example are the same as Example 13. Two elastic yarns are made into core spun yarn together with cotton before being knit. The sheath cotton fibers cover the two core elastic yarns during the core spun process. Two elastic yarn is not exposed on the yarn surface. During knitting, the core spun yarn is fed into the machine and knit into a jersey loop base. Because of the cotton sheath, the fabric has total cotton look and touch. Also, the fabric has low stretch because cotton core spun yarn restrain to excess elongation. The fabric stretch is relatively low and suitable, for example, for men's wear applications.

Example 15

This fabric also has the same materials as Example 13. However, the two elastic yarns are directly fed into machine for knit by plating together side by side. In this way, the interlacing process in Example 13 can be eliminated for cost saving. The fabric also shows excellent stretch and recovery.

Example 16

In this fabric, the ground yarn comprise three threads: 40D LYCRA® spandex fiber, 75D134f LYCRA® T400® polyester bi-component fiber and 20S cotton yarn. They are introduced into the machine together as shown in FIG. 5. 20S cotton yarn constrains the fabric to extend and recovery. Thus, the fabric has low stretch and lower recovery as compared with Example 13 and 15, but higher stretch and recovery than the fabric in Example 14.

TABLE 2

Fabric Examples 17 through 30

| Fabric No | Effect yarn | Ground yarn | Composition | Weight g/M 2 | Knit structure | Machine gauge | Fabric Stretch in Length | Fabric Stretch in Width |
|---|---|---|---|---|---|---|---|---|
| 17 | 15D Textured Nylon + 70D LYCRA ® fiber | Textured 40D Nylon + 70D LYCRA ® fiber | 55% Nylon/45% LYCRA ® fiber | 217.0 | 1/1 | 44 gg | 118.0 | 91.0 |
| 18 | 40D Textured Nylon + 70D LYCRA ® fiber | 140D LYCRA ® fiber | 32% Nylon/68% LYCRA ® fiber | 292.4 | ½ | 28 gg | 132.2 | 145.7 |
| 19 | 70D LYCRA ® fiber | 40D Textured Nylon + 140D LYCRA ® fiber | 39% Nylon/61% LYCRA ® fiber | 231.9 | ½ | 28 gg | 130.0 | 115.0 |
| 20 | 75D LYCRA ® T400 ® fiber + 70D LYCRA ® fiber | 75D LYCRA ® T400 ® fiber + 70D LYCRA ® fiber | 75% LYCRA ® T400 ® fiber/25% LYCRA ® fiber | 238.6 | ½ | 28 gg | 92.0 | 83.0 |
| 21 | 40D Flat Nylon + 70D LYCRA ® fiber | 40D Flat Nylon + 70D LYCRA ® fiber | 58% Nylon/42% LYCRA ® fiber | 259.6 | 1/1 | 44 gg | 118.0 | 80.0 |
| 22 | 15D Flat Nylon + 40D LYCRA ® fiber | 40D Flat Nylon + 40D LYCRA ® fiber | 64% Nylon/36% LYCRA ® fiber | 181.7 | 1/1 | 44 gg | 122.0 | 119.0 |
| 23 | 2X36's cotton CSY | 75D LYCRA ® T400 ® fiber + 70D LYCRA ® fiber | 53.1% cotton/46.9% elastic fiber | 403.5 | ½ | 28 gg | 79 | 45 |
| 24 | 2X50's TENCEL ®fiber | 75D LYCRA ® T400 ® fibe + 70D LYCRA ® fiberr | 60.3% TENCEL ®/ 39.7% elastic fiber | 376.2 | ½ | 28 gg | 97 | 72 |
| 25 | 100D Black supplex ® fiber | 75D Black T400 + 70D Black LYCRA ® fiber | 34.2% nylon/65.8% elastic fiber | 241.9 | ½ | 28 gg | 87 | 21 |
| 26 | 2X32s Indigo + 70D LYCRA ® fiber | 75D LYCRA ® T400 ® fiber + 70D LYCRA ® fiber | 63.8% cotton/36.2% elastic fiber | 369.1 | ½ | 28 gg | 70 | 50 |
| 27 | 75D LYCRA ® T400 ® fiber | 60s cotton + 40D LYCRA ® fiber | 43.3% cotton/56.7% elastic fiber | 349.5 | 1/5, napped | 28 gg | 130 | 95 |
| 28 | 100D Polyester | 15D Textured Nylon + 20D LYCRA ® fiber | 76.0% polyester/24.0% elastic fiber | 142.0 | 1/1 | 44 gg | 62 | 29 |
| 29 | 30 s spun 100% Infrared fiber | 70D Textured Polyester + 70D LYCRA ® fiber | 41.4% polyester/58.6% elastic fiber | 201.7 | ½ , brushed | 28 gg | 100 | 68 |
| 30 | 150D polyester + 150D Infrared filament | 60D Black Nylon + 70D black LYCRA ® fiber | 40.8% polyester/59.2% elastic fiber | 265.3 | ½ | 28 gg | 101 | 64 |

Example 17

A 1/1 plain knit fabric was made with ground yarn and effect yarn. The ground yarn is textured 40D Nylon filaments with 70D LYCRA® fiber and the effect yarn is 15D textured Nylon filaments with 70D LYCRA® fiber. Every course in ground yarn is knitted as single jersey. The effect yarn is knitted with alternating float count 1 and loop count 1 as shown in FIG. 5. In this fabric, both effect yarn and ground yarn comprise elastic yarns. The elastic fiber content is 45% percent of total fabric weight. The fabric has very high stretch and high recovery power in both length and width direction. The stretch level in length and width direction is also very balanced, which can provide comfort in all directions of the fabric as a second skin. Textured Nylon filament is also used in both directions for strength and soft touch. It is an ideal material for intimate wear, such as, but not limited to, bras, underwear and shaping wear, and for active wear, such as, but not limited to, leggings, sportswear and coats. The fabric is made on a 44 gauge knit machine.

Example 18

A 1/2 twill knit fabric was made with ground yarn and effect yarn. The ground yarn is 140D LYCRA® fiber and the effect yarn is 40D textured Nylon filaments with 70D LYCRA® fiber. Every course in ground yarn is knitted as single jersey. The effect yarn is knitted with alternating float count 2 and loop count 1 as shown in FIG. 4. In this fabric, both effect yarn and ground yarn comprise elastic yarns, and the ground yarn contains only elastic yarn without hard yarn. The elastic fiber content is 68% percent of total fabric weight. The fabric has very high stretch and high recovery power in both length and width direction. Textured Nylon filament is also used in ground yarn for soft touch. The knit machine is 28 gauge.

Example 19

A 1/2 twill knit fabric was made with ground yarn and effect yarn. The ground yarn is 40D textured Nylon+140D LYCRA® fiber and the effect yarn is 70D LYCRA® fiber. The effect yarn only has 70D LYCRA® fiber, no hard yarn. Every course in ground yarn is knitted as single jersey. The effect yarn is knitted with alternating float count 2 and loop count 1 as shown in FIG. 4. In this fabric, effect yarn only has elastic yarn without hard yarn. The elastic fiber content is 61% percent of total fabric weight. The fabric has very high stretch and high recovery power in both length and width direction. The fabric surface is covered by elastic yarn, and the fabric provides high friction force on the fabric surface. This characteristic makes the fabric especially useful for stay-in bras or other intimate wear to prevent fabric movement against the body during activity.

Example 20

This fabric is a 1/2 twill fabric with 70D LYCRA® fiber plus 750 LYCRA® T400® fiber in both ground yarn and effect yarn. Thus, the whole piece of fabric in made with 100% elastic fiber. The fabric has excellent recovery power. It is dyed into black dye with disperse dye stuff under 120° C.

Example 21

This fabric is a 1/1 plain fabric with 70D LYCRA® fiber plus 40D flat nylon filament in both ground yarn and effect yarn. The fabric shows high stretch in both length and width direction with a weight of 259.6 grams per square meter. Since flat nylon filament is used, the fabric has a silky look and a smooth touch. These characteristics make it especially useful in intimate wear and sportswear.

Example 22

This fabric is a 1/1 plain fabric with 40D LYCRA® fiber plus 15D flat nylon filament in ground yarn and 40D LYCRA® fiber plus 40D flat nylon filament in effect yarn. The fabric shows high stretch in both length and width direction with a weight of 181.7 grams per square meter. Since flat nylon filament is used, this fabric also has a silky look and smooth touch and is especially useful in intimate wear and sportswear.

Example 23

This fabric is 1/2 twill knit denim with core spun yarn as effect yarn. The core spun yarn is 2×36' cotton as sheath/40D LYCRA® fiber as core. The ground yarn is 70D LYCRA® fiber+75D LYCRA® T400® fiber. In both effect yarn and ground, elastic fibers exist. Therefore, the fabric shows excellent recovery power.

Example 24

This fabric has the same structure and ground yarn material as Example 23. The only difference is in effect yarn with 2×50' TENCEL® spun yarn. After adding TENCEL® fiber, the fabric hand touch becomes very soft.

Example 25

The fabric is made with all black fibers of 100D black Supplex® nylon air textured filament as effect yarn and 75D black LYCRA® T400® fiber plus 70D Black LYCRA® fiber as ground yarn. The fabric exhibits good coverage and color uniformity without requiring dye during finishing. This fabric is especially useful for legging wear in active or casual apparel.

Example 26

A 1/2 twill knit fabric was made with ground yarn and effect yarn. The ground yarn is 75D LYCRA® T400® fiber with 70D LYCRA® fiber and the effect yarn is 2×32' cotton indigo yarn with 70D LYCRA® fiber. Every course in ground yarn is knitted as single jersey. The effect yarn is knitted with alternating float count 2 and loop count 1 as shown in FIG. 4. In this fabric, both effect yarn and ground yarn comprise elastic yarns. The fabric has very high stretch and high recovery power in both length and width direction. The stretch level in length and width direction is also very balanced, thus providing comfort in all directions of the fabrics similar to a second skin.

Example 27

This is a knit fabric with long float in effect yarn. The float count is 5 in float area. Long float provides loose structure of fabric with big inner space and air pockets, which trap more air for better insulation. The fabric is napped into a fleecy appearance on the surface and can be used as a light weight stretch fleece. Elastic yarn LYCRA® T400® fiber is used as the only effect yarn.

Example 28

This fabric is a 1/1 plain fabric very light in weight. The effect yarn is 100D textured polyester filaments with recoverable stretch of 22%. The ground yarn is 15D textured nylon filament and 20D LYCRA® fiber. The fabric can show double side color effects by adding a first color to the polyester face with disperse dye and a second color to the nylon back side with acid dye.

Example 29

A performance fabric with heat generating ability was made from an effect yarn of 30s staple spun yarn with 100% THERMOLITE® IR fiber. THERMOLITE® IR fiber contains polyester based polymer with ceramic particles which generate heat under infrared light. The ground yarn is 70D LYCRA® fiber and 70D textured polyester filaments with 24% recoverable stretch. The fabric back is brushed with a fleecy or velvet-like surface which also increases the fabric warmth and the fabric CLO value for better insulation.

Example 30

This is another knit fabric with heat generating ability. The effect yarn is made from 1500/144f THERMOLITE® fabric IR filament and 150d/144f textured polyester with recoverable stretch 25%. The ground yarn is 60D black nylon filament and 700 black LYCRA® fiber. The fabric is made in a 28 gauge knit machine with ⅝ twill structure and has a weight of 265.3 grams per square meter. It is especially useful for pants and leggings for outdoor wear.

While there have been described what are presently believed to be the preferred embodiments of the invention, those skilled in the art will realize that changes and modifications may be made thereto without departing from the spirit of the invention, and it is intended to include all such changes and modifications as fall within the true scope of the invention.

What is claimed is:

1. An article comprising a knit fabric having a surface side and a base side, and including a set of ground yarns and a layer of effect yarns,
    wherein the ground yarns and effect yarns are knit through intermesh points in a predetermined arrangement,
    wherein the effect yarns are alternately arranged with the ground yarns, and wherein the ground yarns comprise at least one elastic fiber, and the effect yarns comprise at least one hard fiber or at least one elastic fiber;
    wherein said base side of said knit fabric comprises jersey stitch loop structure formed from ground yarns, and
    said surface side of the fabric has a woven appearance resulting from flat floats of the effect yarns and the intermesh point patterns; and
    wherein said knit fabric includes at least one of:
    (a) a ratio of effect yarn denier to ground yarn denier of about 0.3:1.0 to about 10:1;
    (b) a ratio of float count to loop count of about 1:1 to about 6:1;
    (c) the effect yarn floats over at least 1 wale, but no more than 6 wales along the course between adjacent intermesh points; or
    (d) the elastic fiber comprises at least 1% of total fabric weight.

2. The article of claim 1, wherein the elastic fiber content is about 1% to about 85% of total fabric weight.

3. The article of claim 2, wherein the elastic fiber content is about 2% to about 50% of total fabric weight.

4. The article of claim 1, wherein the fabric has no grin-through of jersey loop base from the fabric surface.

5. The article of claim 1, wherein the elastic fiber comprises elastomeric fiber and the content of the elastomeric fiber is higher than 2% of total fabric weight with the elastomeric fiber having at least 1.5× draft.

6. The article of claim 1, wherein the elastic fiber comprises a non-elastomeric elastic fiber and the content of the non-elastomeric fiber is higher than 5% of total fabric weight with denier between 10 denier and 1000 denier.

7. The article of claim 1, wherein the elastic fiber is spandex fiber and the content of the elastomeric fiber is higher than 2% of total fabric weight with the spandex having at least 1.5× draft.

8. The article of claim 1, wherein the elastic fiber is polyester bi-component fiber and the content of the polyester bi-component fiber is about 5% to about 65% of total fabric weight.

9. The article of claim 1, wherein the elastic fibers contain both elastomeric and non-elastomeric fibers, the content of elastomeric fiber is at least 1% of total fabric weight, and the content of non-elastomeric fiber is at least 5% of total fabric weight.

10. The article of claim 1, wherein the ground yarns form the jersey loop base with plain jersey stitch loops in every needle wales of successive courses of the knit fabric.

11. The article of claim 1, wherein the float count of effect yarn is 2 floats.

12. The article of claim 1, wherein the float count of effect yarn is 1 float.

13. The article of claim 1, wherein the hard fiber of ground yarn or effect yarn is selected from the group consisting of wool, linen, silk, polyester, nylon, olefin, cotton, cellulosic fibers and rayon fibers and combinations thereof, with denier range from 150 to 6000.

14. The article of claim 1, wherein the hard fiber of ground yarn or effect yarn is flat or textured polyester or nylon filaments.

15. The article of claim 1, wherein the size of effect yarn is between 100 S to 6S English count number and the effect yarns are single end, or multiple twist threads or multiple separated ends.

16. The article of claim 1, wherein the knit stitch pattern of intermesh between ground yarn and effects yarns are knit loop or tuck loop structure.

17. The article of claim 1, wherein the effect yarn are cotton staple spun yarn, cellulosic fiber spun yarn, cellulosic fiber spun yarn, or blended spun yarn thereof.

18. The article of claim 1, wherein the hard yarn are dyed before knitting.

19. The article of claim 1, wherein the hard yarn are indigo dyed yarn.

20. The article of claim 1, wherein the effect yarn is dyed a first color and the ground yarn are not dyed or dyed asecond color.

21. The article of claim 1, wherein intermesh points form diagonal lines with woven twill appearance.

22. The article of claim 1, wherein the hard fiber comprise special function yarn with moisture management ability, thermal protection ability, anti-bacteria ability and/or soft hand properties.

23. The article of claim 1, wherein the hard fiber generated heat under infrared light.

24. The article of claim 1, wherein the effect yarn or ground yarn is pre-covered elastic yarn selected from the group consisting of core spun yarn, air covered yarn, single wrapped yarn, double wrapped yarn and dual elastic core spun yarn, and combinations thereof.

25. The article of claim 1, wherein intermesh points form diagonal lines of plain woven appearance with alternating 1 float count and 1 knit count.

26. The article of claim 1, wherein the effect yarn is elastomeric yarn.

27. The article of claim 1, wherein the fabric has stretch in both wales and course direction with fabric stretch of at least 10% and at least 75% fabric recovery.

28. The article of claim 1, wherein one side of the fabric has a fleecy or velvet-like surface through napping or brushing.

29. The article of claim 1, wherein the fabric is made by using a circular knit machine, a seamless machine, or a flat knit machine.

30. The article of claim 1, wherein said fabric comprises a garment.

31. The article of claim 30, wherein the fabric has different stretch level and recovery in selected portions of the garment.

32. The article of claim 31 wherein the selected portions comprise knee, thigh and puttportions.

33. The article of claim 30, wherein the garments are dyed and wet finished in garment form.

34. The article of claim 1 wherein the ground yarns further comprise at least one hard fiber.

* * * * *